(12) United States Patent
Mauer et al.

(10) Patent No.: US 11,637,714 B2
(45) Date of Patent: Apr. 25, 2023

(54) EMBEDDINGS-BASED DISCOVERY AND EXPOSURE OF COMMUNICATION PLATFORM FEATURES

(71) Applicant: Salesforce, Inc., San Francisco, CA (US)

(72) Inventors: Aaron Mauer, New York, NY (US); Zhifeng Deng, Fremont, CA (US); Adam Oliner, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 61 days.

(21) Appl. No.: 17/086,287

(22) Filed: Oct. 30, 2020

(65) Prior Publication Data

US 2022/0141043 A1 May 5, 2022

(51) Int. Cl.
| | |
|---|---|
| *G06F 15/16* | (2006.01) |
| *H04L 12/18* | (2006.01) |
| *H04L 51/04* | (2022.01) |
| *H04L 51/216* | (2022.01) |

(52) U.S. Cl.
CPC .......... *H04L 12/1813* (2013.01); *H04L 51/04* (2013.01); *H04L 51/216* (2022.05)

(58) Field of Classification Search
CPC .... H04L 12/1813; H04L 51/216; H04L 51/04
USPC ....................................................... 709/206
See application file for complete search history.

(56) References Cited

U.S. PATENT DOCUMENTS

| | | | |
|---|---|---|---|
| 9,253,130 B2 | 2/2016 | Zaver | |
| 9,342,624 B1 * | 5/2016 | Ojha | ............... G06Q 10/10 |
| 10,229,205 B1 * | 3/2019 | Grant | ............... G06F 16/951 |
| 10,530,714 B2 * | 1/2020 | Ioannou | ............ G06Q 30/0269 |
| 2007/0094338 A1 * | 4/2007 | Kirkham | ............ G06Q 10/107 |
| | | | 709/206 |
| 2008/0225870 A1 * | 9/2008 | Sundstrom | ............ H04L 67/306 |
| | | | 370/465 |
| 2014/0122473 A1 | 5/2014 | Fletcher et al. | |
| 2015/0256491 A1 * | 9/2015 | Eatough | ................ H04L 51/046 |
| | | | 709/206 |
| 2016/0371793 A1 | 12/2016 | Anand et al. | |
| 2017/0054587 A1 | 2/2017 | Wade et al. | |
| 2018/0218382 A1 | 8/2018 | Ye et al. | |
| 2018/0285700 A1 | 10/2018 | Stoop et al. | |
| 2018/0287982 A1 | 10/2018 | Draeger et al. | |

(Continued)

OTHER PUBLICATIONS

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Imad Hussain

(74) *Attorney, Agent, or Firm* — Lee & Hayes, P.C.

(57) ABSTRACT

Discovery of communication platform features or exposure of such features to the user may include generating embeddings for a variety of types of communication platform content and communications. These embeddings may be used to characterize and compare various communication platform features and ultimately expose these features to a user when the user may not have otherwise encountered them. The embeddings may additionally or alternatively be used to determine a degree of alignment.

20 Claims, 5 Drawing Sheets

(56) References Cited

U.S. PATENT DOCUMENTS

| | | | |
|---|---|---|---|
| 2018/0376185 A1 | 12/2018 | Lonstein et al. | |
| 2019/0190863 A1* | 6/2019 | Baker | H04L 63/104 |
| 2019/0294999 A1 | 9/2019 | Guttmann | |
| 2019/0319900 A1 | 10/2019 | Marlow et al. | |
| 2020/0192881 A1 | 6/2020 | Largman et al. | |
| 2020/0336501 A1 | 10/2020 | Lewis et al. | |
| 2020/0349226 A1 | 11/2020 | Ristoski et al. | |
| 2020/0364507 A1 | 11/2020 | Berry | |
| 2020/0380311 A1 | 12/2020 | Lourentzou et al. | |
| 2021/0303716 A1 | 9/2021 | Janakiraman et al. | |
| 2022/0141263 A1* | 5/2022 | Mauer | H04L 51/04 |
| | | | 709/206 |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/2context=1000516, (dated Feb. 6, 2015, 2:12 AM) 4 pages.

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3M560-861e-d030d1dd008c/?context=1000516, (dated Feb. 12, 2014, 7:03 PM), 3 pages.

"Internet Relay Chat," Wikipedia, [online] [retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (BITS), LexisNexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Office Action for U.S. Appl. No. 17/086,310, dated Jan. 31, 2022, Maurer, "Embeddings-Based Recommendations of Latent Communication Platform Features", 24 pages.

Office Action for U.S. Appl. No. 17/086,310, dated Dec. 17, 2021, Mauer, "Embeddings-Based Recommendations of Latent Communication Platform Features", 6 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, LexisNexis, https://advance.lexis.com/api/permalink/e83778c8-09c8-43aa-9ba0-88526283de69/?context=1000516, (dated Aug. 1, 2014, 5:45 PM) 5 pages.

Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 3 pages.

Office Action for U.S. Appl. No. 17/086,310, dated May 31, 2022, Mauer, "Embeddings-Based Recommendations of Latent Communication Platform Features", 13 pages.

Office Action for U.S. Appl. No. 17/086,310, dated Nov. 22, 2022, Mauer, "Embeddings-Based Recommendations of Latent Communication Platform Features", 17 pages.

* cited by examiner

EMBEDDINGS-BASED DISCOVERY AND EXPOSURE OF COMMUNICATION PLATFORM FEATURES

TECHNICAL FIELD

Individuals and various institutions, such as businesses, schools, and clubs, increasingly rely on sophisticated communication platforms to facilitate efficient task-related communications. Because of the increased volume of use of such platforms, content and communications available on such a communication platform may be increasingly redundant and difficult to find without sophisticated experience with the platform or long-standing familiarity with the organization's use of the platform.

Additionally, some users may be members of multiple organizations that use the communication platform. Even though a long-standing user may be very familiar with one organization's use of a communication platform, the user may find that another organization uses the communication platform in a very different manner, preventing the long-standing user from encountering the features the user needs and/or causing the user to create redundant content and/or communications, further exacerbating the issue. Moreover, very few, if any users, spend time cleaning up unused or redundant channels and/or familiarizing themselves with features of the communication platform outside of the most basic functions, thereby reducing the effectiveness of the communication platform.

Ultimately, these issues may cause a communication platform to become more of a burden for users than an effective tool and may cause multiple technical issues, such as clogging computer memory because of redundant content, congesting network bandwidth, and/or using up server or cloud service compute cycles.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
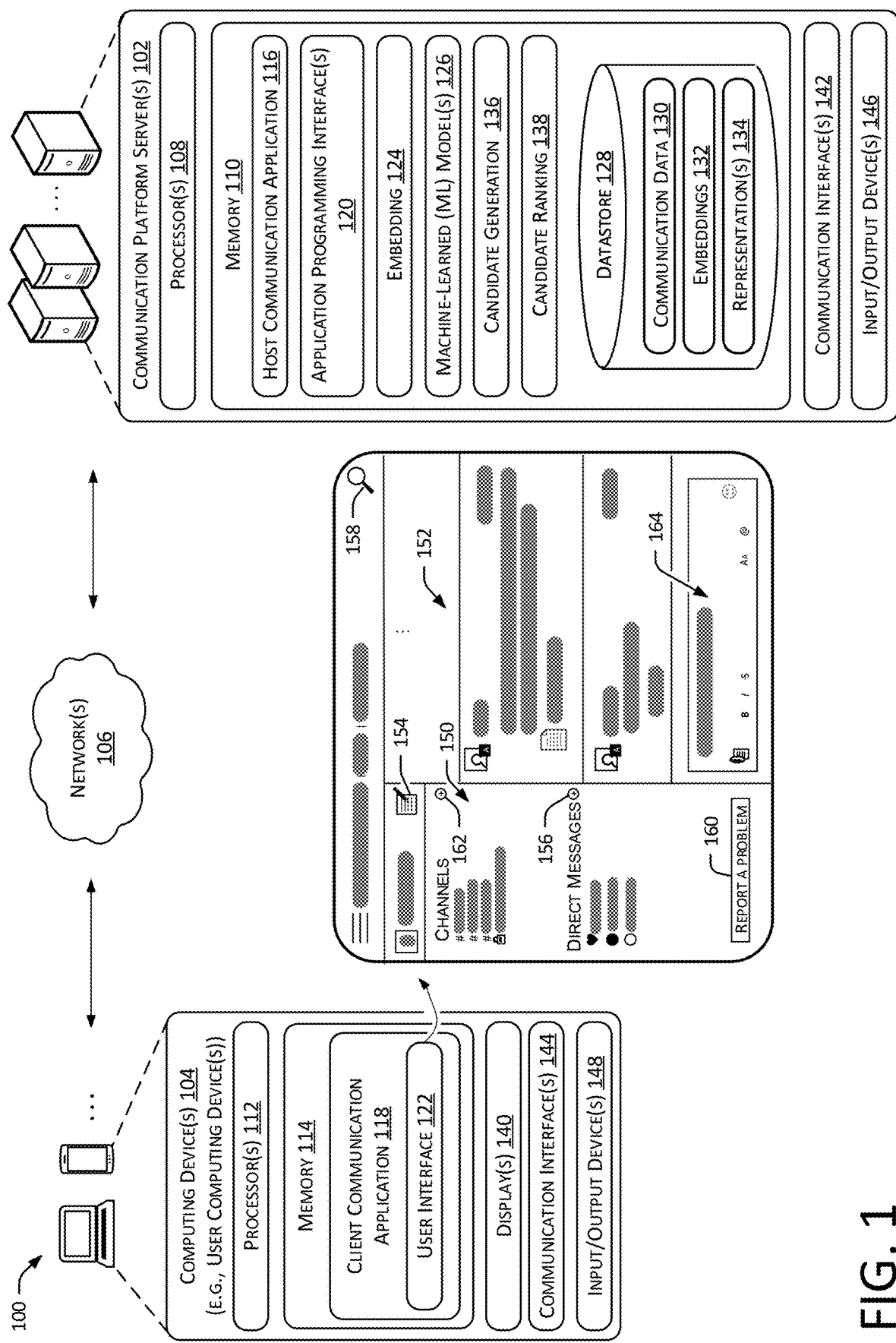
FIG. 1 illustrates a block diagram illustrating an example system of computing devices usable to implement example techniques described herein.

The techniques discussed herein include machines and processes for facilitating user discovery of communication platform features or exposing such features to the user without explicit prompting or request by the user. The techniques include generating embeddings for a variety of types of communication platform content and communications, collectively referred to herein as communication data. The communication platform may be a channel-based messaging platform. These embeddings may be used to characterize and compare potentially non-obvious relations between communication platform features and expose these features to a user when the user may not have otherwise encountered or discovered them (e.g., through a keyword search, by continuing to use the communication platform according to the user's knowledge of the platform or of the organization's use of the platform).

For example, the techniques may include a candidate generation component that generates a representation of interactions occurring across the communication platform and generates an embedding based at least in part on a portion of that representation such embeddings are referred to herein as "graph embeddings." The representation may indicate how entities interact via the communication platform, such as by representing a user's interaction with a particular channel; a user's interactions with other user(s); users that have joined a same two or more channels (i.e., an overlap of membership between multiple channels) or that have shared a same file or message in two different channels; etc. Although the representations may be based at least in part on semantic data, in some cases such representations are primarily concerned with representing a frequency and/or quality of interaction. For example, even if two users sent messages with identical text repeatedly in different sets of channels, the representation would capture the patterns of the two users' interactions with the different channels and indicate the channels the two users' most frequently interact with and/or have a more in-depth interaction with.

A candidate generation component may generate a representation based at least in part on a set of representation parameters that may control the type and format of the representation generated by the candidate generation component. For example, a first set of representation parameters may cause the candidate generation component to generate a representation of a user's interactions with channel(s), a second set of representation parameters may cause the candidate generation component to generate a representation of a user's interactions with one or more users, etc. According to various examples, the different representations may be combined (e.g., as different dimensions, axes, or portions of a same representation) or may be separate representations.

The representation may be used to indicate various qualities or characteristics of the transmissions over, and/or interactions between, entities of the communication platform herein. In at least one example, the representation may be an undirected or directed graph comprising nodes (vertices) representing features (e.g., users, channels, files, or the like depending on the type of representation) and a weighted edge that may associate at least two nodes and that represents the extent or amount of interaction via the communication platform between the two features represented by the nodes. In an additional or alternate example, the representation may comprise a relational database comprising different axes or dimensions associated with different feature types and a portion of the database that comprises values that indicate the extent or amount of interaction occurring between entities via the communication platform. Other formats for the representation are contemplated.

In some examples, at least part of the representation may be computed on-the-fly in response to a request or input of a user, although in additional or alternate examples at least part of the representation may be precomputed. According to the latter example, the candidate generation component may periodically update the representation based at least in part on additional activity that has occurred via the communication platform since the last update. Updating the representation may comprise removing a portion of the representation that is obsolete (e.g., a feature such as a user account, message, file, or channel that has been deleted), adding a portion to the representation (e.g., new feature added since last update, such as a new user, message, file, channel, etc.), and/or modifying a portion of the representation (e.g., updating a weight of an edge to reflect additional interactions). In some examples, the representation may be associated with a time window. For example, the representation may represent interactions among entities over the last day, week, month, three months, year, three years, or any other time period.

Once a representation has been generated, the techniques discussed herein may comprise determining an embedding of at least a portion of the representation (e.g., a portion indicating a user's level of interaction with a particular channel, a channel's relatedness to another channel). The techniques may comprise an embedding algorithm that may receive as input at least a portion of the representation and/or features associated therewith, such as communication data, and may transform that input into a location in an embedding space, which may be a high dimension space. For example, the embedding space may be 32-dimensional, 256-dimensional, 512-dimensional, or more-dimensional space, although it is also contemplated that the embedding space may have less dimensions. The embedding algorithm is designed to assign locations in the embedding space based on the similarity (or dissimilarity) of the input to previous inputs. For example, the embedding algorithm may receive a set of nodes and a weighted edge associated with a user's interaction with one or more channels and map that portion of a graph to the embedding space, assigning the portion of the graph a vector representing that location in the embedding space. That location/vector is referred to herein as an embedding.

The techniques may additionally or alternatively comprise an application programming interface (API) that may cause the candidate generation component discussed herein to generate a graph embedding and provide at least one candidate feature based at least in part on the graph embedding. For example, the API may receive a request to provide a candidate feature from another component of the communication platform. For example, such a request may be created by the communication platform responsive to receiving communication data (e.g., a new message, message draft, query, file, or the like) or detecting an interaction of interest. Such an interaction may include a definition of a user interaction with the communication platform, such as a user joining a channel, a user opening a file or reading a message, a user being granted permission to access a channel or workspace associated with the communication platform, or the like.

Upon receiving a request, the API may cause the candidate generation component to generate and/or retrieve a graph embedding associated with the request. In some examples, the request may specify or be associated with a particular type of representation. For example, if the request was generated responsive to a user joining a channel, the representation associated with the request may be a graph relating channels to channels or users to channels. In another example where the request was generated responsive to a user starting a draft message by identifying one or two other users, the representation associated with the request may relate users to users to users or users to channels.

If a portion of the representation and/or graph embedding associated with the request does not exist, the candidate generation component may generate a portion of the representation suitable for responding to the request. For example, if a user just joined a channel, triggering a request, determining whether the representation includes a portion associated with the request may comprise determining whether the representation includes a portion associated with the user and/or the channel. If no such portion exists, the candidate generation component may generate the portion and/or a graph embedding associated with the portion; if the portion does exist, the candidate generation component may receive the portion and/or any other related portions from a memory storing the representation.

Once the appropriate portion of the representation has been generated or retrieved, the techniques may include identifying a graph embedding associated with the request and determining a nearest n number of neighbors in the embedding space (e.g., the embeddings that are nearest), where n is a positive integer, and the features associated therewith. Identifying the graph embedding may comprise computing the graph embedding and/or retrieving the graph embedding from memory if the graph embedding was pre-computed. Depending on the type of representation upon which the embeddings are based, the nearest neighbors may include embeddings associated with channels, users, files, workspaces, or any communication data transmitted via the communication platform. In some examples, identifying the nearest neighbors may be based at least in part on a distances between the graph embedding and other graph embeddings or other methods of determining a similarity of the graph embeddings, such as computing a dot product between the graph embedding associated with the request and another graph embedding.

The number of features, n, output by the candidate generation component responsive to the request may be based at least in part on a number specified by the request, which may be based on a type of the request, dimensions of an portion of a user interface available to be populated with a recommendation (e.g., there may only be space for one, two, three, or any other number of recommendations), and/or a type of the feature that is returned (e.g., displaying recommendations for different features may occupy more or less space in a user interface depending on the feature type).

In some examples, the candidate generation component may output n candidate features based at least in part on the graph embedding techniques discussed herein and the API may select one or more of the n candidate features for display via a user interface at a user's computing device. In some examples, the API may receive additional candidate features from other candidate generation components other than the candidate generation component that determines the representation and graph embeddings as discussed herein. In such an example, the candidate generation components may use different methods and/or hardware for determining a set of candidate features to propose to a user via a user interface.

For example, in an example where a user joins a channel, the graph embedding candidate generation component may identify a first set of candidate features to propose to the user using the graph embedding techniques discussed herein and one or more other candidate generation components may identify one or more additional sets of candidate features to propose to the user. The first set of candidate features and a second set generated by a different candidate generation component may or may not include at least some of the same features and may output a same or different number of candidate features. Other candidate generation components may include components that generate candidates based on semantic embeddings (e.g., embeddings generated based at least in part on text associated with a message), channels that have recently had users join, overlap in membership between channels, most frequently contacted user records, and/or the like. Depending on the request, the API may cause different ones of the candidate generation components to identify candidate features although, in at least one example, the API may cause all of the candidate generation components to generate candidate features. The API may discard an entire set of candidate features generated by a candidate generation component if probabilities associated with the set do not meet or exceed a probability threshold.

In some examples, a candidate generation component, regardless of the type, may determine a probability associated with a candidate feature identified by the candidate generation component. The probability may indicate a likelihood that the candidate feature satisfies a target metric. For example, satisfying a target metric may include meeting or exceeding a threshold or indicating a higher value than other candidate features, as ranked according to the target metric. The target metric may include one or more metrics, which may be combined or used individually as part of a linear optimization algorithm, such as a number of messages read and/or transmitted, a number of users that the user may invite to the channel, a number of files that a user will open and/or upload to a channel, whether a user is an appropriate entity to include in a multi-party direct message, a percentage or number of messages to which a user will respond in a channel, and/or the like. Although the examples given above may include any positive integer, the target metric may be re-cast as a binary indication, such as whether or not a user will invite any other users to a channel, whether or not a user will upload or open any files, etc.

In some examples, a candidate generation component may determine a probability associated with a candidate feature based at least in part on the target metric, although in an additional or alternate example, the API may rank candidate features from the different candidate generation components based at least in part on the target metric. In other words, generating the probabilities may be based at least in part on the target metric and/or ranking the candidate features may be based at least in part on the target metric and the probabilities.

The API may receive different sets of candidate features from the different candidate generation components and respective probabilities associated with the candidate features and the API may rank the candidate features based at least in part on the probabilities and/or target metric. The techniques discussed herein may solve the issue of disambiguating which one of two or more candidate features is most likely to be useful to a user when the two or more candidate features may be associated with a same or similarity probability as determined by the candidate generation component that output the respective candidate feature. For example, a first candidate generation component may output a first candidate feature associated with a probability of 0.9 and a second candidate generation component may output a second candidate feature associated with a probability of 0.9. Since the candidate features are different and yet have a same probability, one of the candidate features can't be identified as being associated with a greater probability. In some examples, a candidate generation component may comprise a machine-learned (ML) model trained to determine a probability associated with a particular candidate feature, although the candidate generation components may vary in the manner in which they determine the probability and some candidate generation components may not determine a probability associated with a candidate feature.

The techniques discussed herein may comprise amalgamating and/or weighting a candidate feature based at least in part on the probability(ies) associated with the candidate feature across the outputs of one or more candidate generation components. For example, a candidate feature, such as a particular channel, user, file, or such may be associated with a first probability output by a first candidate generation component, a second probability output by a second candidate generation component, and so on. In some examples, the API may comprise a machine-learned (ML) model or an ensemble of ML models for generating an aggregated probability associated with a candidate feature. In an additional or alternate example, the aggregated probability may be an average or weighted average of the probabilities associated with the candidate feature where the weights are based at least in part on the request type. For example, a candidate generation component may be more suited to proposing candidates for a particular type of request and the probabilities generated thereby may therefore be more heavily weighted.

The API may select one or more candidate features for proposal to the user based at least in part on ranking the candidate features. The proposed features may be included in a recommendation transmitted to a computing device associated with a user. Such a recommendation may comprise computer-executable instructions that may be executed at the user's computing device and may cause display of a user interface element associated with a proposed feature. The user interface element may be selectable by the user to cause an action at the communication platform, such as causing the user to join a channel, adding another user as a recipient for a draft message, adding another user to a channel, or the like. For example, in an example where user has just joined a channel, the recommendation may comprise a suggestion to join a second channel and an interface element selectable via input provided via a computing device to cause the user to be added to the second channel. The interface element could additionally or alternatively include a recommendation to invite another user to join the channel and an interface element selectable to cause an invitation to be transmitted and/or for the other user to be added to the channel.

The techniques discussed herein may surface relevant features that couldn't or wouldn't be likely to be discovered by keyword or Boolean operator-based search or even by examining an organizational chart. For example, a large organization may have hundreds or thousands of channels within the communication platform. Without the techniques discussed herein, a user may not discover a channel that would be useful to the user and which the user might not think to search for, or the user may not be aware of another user to address a message to (e.g., due to forgetfulness, due to the user being unfamiliar with the other users or best practices for who to include on a message).

The techniques described herein may enhance users' ability find communications and/or other content (collectively, features) of the communication platform, even if a user does not use search terms that match the communications or content for which they're searching and even when a user may be unfamiliar with search techniques or the communication platform itself. Moreover, the techniques may enhance the user experience by ensuring that communication data of a similar type can reliably be found in a same place in the communication platform, even though not all individuals will use the communication platform in the same manner (e.g., thinking to organize the communication platform in a certain way, use certain tools in certain channels, use particular channels for a same topic) and a same individual may not even use the communication platform consistently. Continuity of the organization of the communications and/or content and means by which a user can retrieve or discover communication data is critical to efficient communication and making progress on deliverables—the techniques described herein increase the continuity of the organization of the communication data and the means by which such data is retrieved. Moreover, the techniques discussed herein may reduce or eradicate the need to inform, coordinate, or moderate user submissions via the communication platform to preserve the consistency of the communication data. The techniques discussed herein may funnel user interactions over the communication platform to the correct features, thereby reducing duplication in data and exponential growth of features (e.g., growth in the number of channels, direct message conversations).

The techniques described herein may improve performance of a user computing device by reducing the amount of content downloaded to the user computing device in association with a local communication application associated with the communication platform. For example, the techniques may include methods for exposing communication data that already exists on the communication platform, which may prevent a user from redundantly creating communication data, which may also reduce network bandwidth, storage use at the communication platform server(s), and/or computing cycles on both the user end and server end. The techniques described herein improve performance of one or more computing devices by reducing an amount of content sent over a network, which may improve transmitting, intervening, and receiving computing devices. By exposing existing communication data and reducing redundant communication data, the techniques may also improve the user experience and the usefulness of the communication platform for making tangible progress on various projects and deliverables since communication features are exposed when they're needed and channels may not be cluttered with communication data that is relevant to a different project than a project for which a channel or workspace is defined.

Furthermore, the techniques described herein may improve the privacy and security associated with the communication data since the embedding algorithm may be lossy and/or more be designed to have steganographic properties, which may reduce the likelihood that an attacker could discover the original data and/or reverse the embedding to discover the original from the embedding. Regardless, the embeddings may be stored in secure storage on the communication platform server(s) in at least one instance and may not be pushed to a user computing device, although in an alternate example, an encrypted version of an embedding may be provided to a user computing device and/or intermediate network device(s).

These and other aspects are described further below with reference to the accompanying drawings. The drawings are merely example implementations and should not be construed to limit the scope of the claims. For example, while some examples are illustrated in the context of a user interface for a mobile device, the same or similar techniques may be implemented using any computing device and the user interface may be adapted to the size, shape, and configuration of the particular computing device.

Example System(s)

FIG. 1 illustrates a block diagram illustrating an example system 100 of computing devices usable to implement example techniques described herein. In at least one example, the example system 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples, such groups of users can be defined by group identifies, as described above, which can be associated with common access credentials, domains, or the like. In some examples, the communication platform can be a hub, offering a secure and private virtual space to enable users to chat, meet, call, collaborate, or otherwise communicate between or among each other. As described above, each group can be associated with a workspace, enabling users associated with the group to chat, meet, call, collaborate, or otherwise communicate between or among each other in a secure and private virtual space. In some examples, the communication platform is a channel-based messaging platform—in other words, channels of the communication platform may be central component of the manner of communicating and providing content via the communication platform. In some examples, members of a group, and thus workspace, can be associated with a same organization. In some examples, members of a group, and thus workspace, can be associated with different organizations (e.g., entities with different organization identifiers).

FIG. 1 illustrates example system 100 as comprising example computing devices including communication platform server(s) 102 and one or more computing devices 104 (e.g., user computing device(s)) associated with a first user, that interact over a network 106. By way of example and not limitation, the communication platform server(s) 102 may be representative of servers used to implement a communication platform system, the first computing device(s) 104 may be representative of user device(s) associated with a first user. The user computing device(s) 104 may be any suitable type of computing device, e.g., portable, semi-portable, semi-stationary, or stationary. Some examples of the user computing device(s) 104 can include a tablet computing device, a smart phone, a mobile communication device, a laptop, a netbook, a desktop computing device, a terminal computing device, a wearable computing device, an augmented reality device, an Internet of Things (JOT) device, or any other computing device capable of sending communications and performing the functions according to the techniques described herein.

In at least one example, the example system 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples, such groups of users can be defined by group identifies, as described above, which can be associated with common access credentials, domains, or the like. In some examples, the communication platform can be a hub, offering a secure and private virtual space to enable users to chat, meet, call, collaborate, or otherwise communicate between or among each other. As described above, each group can be associated with a workspace, enabling users associated with the group to chat, meet, call, collaborate, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

The communication platform server(s) 102 may comprise one or more individual servers or other computing devices that may be physically located in a single central location or may be distributed at multiple different locations. The communication platform server(s) 102 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. The network(s) 106 may comprise a single network or collection of networks, such as the Internet, a corporate intranet, a virtual private network (VPN), a local area network (LAN), a wireless local area network (WLAN), a cellular network, a wide area network (WAN), a metropolitan area network (MAN), or a combination of two or more such networks, over which the user computing device(s) 104 may access the communication platform and/or communicate with other user computing device(s) via the communication platform. Components used for such communications can depend at least in part upon the type of network, the environment selected, or both. Protocols for communicating over such network(s) 106 are well known and are not discussed herein in detail.

Each of the computing devices described herein may include one or more processors and/or memory. Specifically, in the illustrated example, communication platform server(s) 102 include one or more processors 108 and memory 110 and computing device(s) 104 include one or more processors 112 and memory 114. By way of example and not limitation, the processor(s) may comprise one or more central processing units (CPUs), graphics processing units (GPUs), field-programmable gate arrays (FPGAs), and/or process-acceleration devices such as application-specific integrated circuits (ASICs) or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory may comprise one or more non-transitory computer-readable media and may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/flash-type memory, or any other type of memory capable of storing information. The architectures, systems, and individual elements described herein may include many other logical, programmatic, and physical components, of which those shown in the accompanying figures are merely examples that are related to the discussion herein. The computer-readable memories 110 and 114 can be used to store any number of functional components that are executable by the processor(s) 108 and/or 112, respectively. In many implementations, these functional components comprise instructions or programs that are executable by the processor(s) 108 and/or 112 and that, when executed, specifically configure the processor(s) 108 and/or 112 to perform the actions attributed to the server(s) 102 and/or the computing device(s) 104, according to the discussion herein.

As shown in FIG. 1, communication platform server(s) 102 include a host communication application 116 and computing device(s) 104 includes client communication application 118 that enables interaction of content via the communication platform server(s) 102 among one or more computing devices associated via the communication platform. For example, content (e.g., messages including text, images, audio, video, etc.) can be shared among users associated with user accounts of an online communication network provided by the communication platform system and may include sharing content in accordance with a user account that is restricted, such as based on a type of account; an organization associated with the user/an organization account that has authorized access of the communication platform via the organization's account; a workspace that the user has joined or to which the user was added, or the like. In some examples, the communication client application enables interfaces to access content, to view content, and to generate content as those described with reference to FIGS. 2-8 for example. In particular examples, communication platform server(s) 102 send instructions to present, transmit, and receive content and/or instructions as discussed with reference to FIGS. 2-8. In some examples, the communication platform server(s) 102 may expose interface options that are unique to the techniques discussed herein and, in some cases, may not be otherwise available to a user, although, in other examples, the user may access the interface options through a traditional manner of using the communication platform.

In some examples, the communication platform can be a channel-based messaging platform, that in some examples, can be usable by group(s) of users. Users of the communication platform can communicate with other users via communication channels. A communication channel, or virtual space, can be a data route used for exchanging data between and among systems and devices associated with the communication platform. In at least one example, the host communication application 116 can establish a communication channel between and among various user computing devices, allowing the user computing devices to communicate and share data between and among each other. In at least one example, the communication application 116 can manage such communications and/or sharing of data. In some examples, data associated with a communication channel can be presented via a user interface. In at least one example, the host communication application 116 can interact with the computing device(s) 104 via one or more application programing interfaces (API(s)) 120 to manage the generation, presentation, and/or updating of user interfaces. In some examples, at least one of the API(s) 120 discussed herein may identify one or more features to propose to a user from among a set of candidate features generated by the candidate generation component(s) discussed herein.

In at least one example, the host communication application 116 and/or client communication application 118 can be a mobile application, a web application, a database interface (e.g., such as an application that presents a SQL or other database interface), or a desktop application, which can be provided by the communication platform or which can be an otherwise dedicated application. In some examples, individual user computing devices associated with the example system 100 can have an instance or versioned instance of the client communication application 118, which can be downloaded from an application store, accessible via the Internet, or otherwise executable by the processor(s) 112 to perform operations as described herein. That is, the application 118 can be an access point, enabling the user computing device(s) 104 to interact with the server(s) 102 to access and/or use communication services available via the communication platform, such as accessing the host communication application 116 and/or embedding component 124 via the API(s) 120. In at least one example, the client application 118 can facilitate the exchange of data between and among various other user computing devices, for example via the server(s) 102. In at least one example, the client communication application 118 may comprise instructions for causing presentation of a user interface 122, which may comprise visual, audible, and/or tactile features. A non-limiting visual representation of a general user interface 122 is illustrated in FIG. 1 More detailed user interface are illustrated in the following figures.

In some examples, the host communication application 116 may differ from the client communication application 118 by including or accessing one or more application programming interface(s) (API(s)) 120 for exposing backend functions offered by the communication platform server(s) 102 to the computing device(s) 104 without transferring the functions to the computing device(s) 104 and/or accomplishing the functions at the communication platform server(s) 102. As relates to the instant discussion, this may comprise API(s) for receiving communication data from the computing device(s) 104, such as a message or any of the communication data discussed herein, and determining an embedding, identifying one or more nearest neighbors based at least in part on the techniques discussed herein, and returning an indication of one or more communication platform features or instructions associated therewith (e.g., instructions to cause a user interface 122 associated with the client communication application 118 to display an option to populate a channel or user identifier for the message that triggered the API call).

In some examples, the client communication application 118 may comprise computer-executable instructions to a call an API in the examples discussed herein. For example, if a user starts to compose a new direct message and identifies one or two or more users as recipients, the client communication application 118 may transmit (via network(s) 106) an API call and the recipient user(s) to the host communication application 116 and/or the API(s) 120. Additional or alternate API requests are discussed herein, such as transmitting an identification of a channel and/or user responsive to a user joining a channel, the content of a draft message responsive to a user drafting a message, etc. Responsive to receiving such a request, the API(s) 120 may transmit at least part of the request to and/or otherwise receive embedding(s) from the embedding component 124 at communication platform server(s) 102.

FIG. 1 further illustrates communication platform server(s) 102 as including embedding component 124 and machine-learned (ML) model 126, which may carry out at least some of the operations discussed herein. In at least one, the ML model 126 may additionally or alternatively be stored in memory 114 of the computing device(s) 104. In some examples, a request made by the API(s) 120 may identify or otherwise reference items in datastore 128, which may be an additional portion of and/or accessible to the communication platform server(s) 102. In at least one example, a datastore 128 can be configured to store data that is accessible, manageable, and updatable, such as communication data 130. In some examples, the datastore 128 can be integrated with the server(s) 102, as shown in FIG. 1. In other examples, the datastore 128 can be located remotely from the server(s) 102 and can be accessible to the server(s) 102 and/or user device(s), such as the user device(s) 104. The datastore 128 may comprise multiple databases, which can include communication data 130, embeddings 132, and/or representation(s) 134, although the datastore 128 may store additional or alternative data. In some examples, any content or communications that are transmitted via the communication platform may be stored in datastore 128 until deletion therefrom.

The techniques discussed herein may comprise online and/or offline processing of communication data 130 by embedding component 124 and/or ML model(s) 126. The embedding component 124 may comprise an online component that receives calls via the API(s) 120 from computing device(s) 104. Such calls are described in more detail herein. For example, the client communication application 118 may make a call to the embedding component 124 when a user joins a channel, enters two or more users as recipients for a message, starts typing a subject or body of a new message, starts typing a search query, transmits a message or search query, starts creating a new channel or workspace, when the user attaches a file to a message, when the user creates a ticket, when the user calls an application integrated into a channel, etc. The communication data generated by the user according to any such example or others may be provided to the embedding component 124, which may determine an embedding associated with the (live) communication data received from the user, determine one or more nearest embeddings based at least in part on embeddings 132, and transmit the results and/or instructions to the computing device(s) 104, as discussed in more detail herein. Regardless of whether the embedding component 124 generated an embedding online or offline, the embedding component 124 may store the embedding in the datastore 128 and retain the embedding until the associated communication data 130 is deleted from the datastore 128. The datastore 128 may associated an individual piece of communication data 130 with its respective embedding and, as may be applicable to some types of communication data 130, the representation(s) 134 associated therewith.

The embedding component 124 may comprise a pre-processing component (e.g., which may generate at least a portion of a representation), an embedding algorithm for generating embeddings. In some examples, the pre-processing component may comprise a component for unfurling (e.g., detecting that message contents include a link, crawling the link's metadata, and determining a uniform summary of the metadata) and/or one or more of the ML model(s) 126, such as for generating embeddings for images, videos, audio, computer code, etc. In such an example, the ML model(s) 126 may comprise one or more neural network layers that function as one or more pre-processing layer before one or more embedding layers and/or, in some examples, the embedding algorithm may itself comprise one or more neural network layers. In some examples, unfurled data and/or ML model output data may be used as input to the embedding algorithm.

In some examples, the pre-processing component of the embedding component 124 may generate a representation 134 of interactions between various features of the communication platform. For example, the embedding component 124 may generate a representation of interactions between a user and a channel(s), a user and user(s), channel and channel(s), user and file(s), channel and file(s), or the like. The representation may comprise a graph that indicates the interactions of any of the features across all of an organization's transmissions over the communication platform or across a subset of the organization's transmissions. The representation may include any other suitable technique for representing the interactions, such as a relational database. In some examples, the embedding component 124 may generate a representation responsive to an API call and/or offline at periodic time interval, which may reduce the time to respond to an API call.

In various examples, the embedding component 124 may comprise an offline component for processing batches of (historical) communication data 130 and an online component for processing newly received communication data 130.

The offline component may process batch(es) of communication data that have been stored in the datastore 128 whereas the online component may process direct calls from the client communication application 118 to an API to make use of the embedding component 124 and may comprise data that may or may not end up being stared in the datastore 128, such as message drafts or queries. Upon instantiation of the techniques discussed herein, the embedding component 124 may run the offline component and retrieve communication data 130 associated with one or more previous time periods from datastore 128 and determine embeddings associated with the communication data 130, effectively creating a history of embedding(s) 132 and/or representations(s) 134 associated with the communication data 130. At instantiation, this may comprise going back weeks, months, a year, years, and/or back to the inception of the organization's use of the communication platform to process the communication data 130 associated with the organization's use of the communication platform After instantiation, the offline component may regularly batch process communication data 130 that has newly been added to the datastore 128 and that wasn't processed due to an API call (e.g., using the API function). For example, the embedding component 124 may batch process communication data 130, generating embeddings for new communication data 130, on a nightly, weekly, or monthly basis. In some examples, the batch processing rate may depend on the communication data type—interaction patterns associated with private messages may drift more quickly than the interaction patterns associated with a channel, so communication data associated with a channel may be processed at a more frequent rate, such as on a daily versus a weekly basis.

The embedding component 124 may be configured to keep the representation(s) 134 updated as additional communication data 130 is transmitted via the communication platform. Keeping the representation updated may include periodic offline updates to the representation and/or online updates to the representation based at least in part on requests generated via the API, such as according to the examples discussed herein. The representation may be associated with a sliding time window, in some examples, such as the last week, the last month, the last quarter, the last year, or any other time period. In additional or alternate example, the representation may be generated and maintained for all communication data 130 associated with an organization, regardless of the amount of time the communication data 130 has existed or until the communication data 130 is deleted by a user or according to a retention policy. In some examples, the embeddings 132 and/or representation(s) 134 may be associated with a retention window that may or may not match a retention window associated with communication data 130. Either of these retention windows may be set by an administrator of an organization's account or may be fixed based on a service level associated with the communication platform provisions to an organization.

Whereas the representation indicates and/or quantifies interactions between various features of the communication platform, the embedding may be a machine-learned classification and/or dimensionally-reduced representation of at least a portion of the representation. Although this embedding is termed a "graph embedding" herein since the representation from which the embedding is generated may include a graph, it is understood that the representation may take other forms and should not be limited to only being a graph. In some examples, generating an embedding of at least a portion of a representation may comprise determining a singular value decomposition (SVD), thin SVD, compact SVD, and/or truncated SVD of at least a portion of the representation. In an additional or alternate example, the embedding algorithm may include a neural network layer that is learned jointly with a neural network model, Word2Vec, GloVe, t-distributed stochastic neighbor embedding (t-SNE), and/or the like. Communication data 130 may be used to supervise training of some of the models discussed herein in some examples. For example, direct user input that classifies or implicitly classifies or assigns a value to data may be used as part of training data for the models discussed herein. For example, this input may comprise accepting a rejecting a recommendation that is based at least in part on an embedding, moderation operations (e.g., moving a conversation, message, user, etc. from one channel to a different channel; merging two channels; splitting a channel into two channels), identifying a user as an additional recipient for a message, mentioning a user, reacting to a message, joining a channel, or the like.

In some examples, the embedding may not be humanly comprehensible. For example, the embedding may be a tensor or vector with values that are unlabeled or that do not have significance apart from their relation to other embeddings' values. In an additional or alternate example, values of an embedding may carry a meaning associated with a system of measurement/quantification. Regardless, the embedding component 124 may output an embedding responsive to a request form API(s) 120 and/or according to a periodic determination of embeddings for expedited retrieval from the datastore 128.

Communication data 130 may include a message, threaded message, query, file (e.g., document, spreadsheet, computer code, image, video, audio, electronic contact information), mention, user or user profile, interaction (e.g., reaction, edit, deletion, prioritization such as by pinning or starring), ticket, channel, application integrated into one or more channels, conversation (e.g., group of messages that has been segmented as a single unit), workspace (e.g., a set of channels, users, projects, tasks within an organization that may have its own set of permissions; may be organized substantially in line with an organization chart in some instances), etc. that are associated with an organization's transmissions using the communication platform. A mention may include a user identifier, a channel identifier, an organization identifier, an application identifier, etc. although the depicted example only includes a user identifier. A threaded message may be a message with a unique thread identifier that identifies a parent message and that may be formatted, represented, and/or stored differently than other messages.

Application(s) may be integrated into a channel of the communication platform by giving API(s) of the application permissions to receive communication data sent over a channel or via direct message(s) to the application. This may allow the application to take actions outside of the communication platform and/or within the communication platform that are related to the communication data and/or responsive to commands embedded in the communication data within the communication platform. For example, the application may comprise software-as-a-service (SaaS) or other cloud-based services, a local application running on the user computing device, or the like. In some examples, data that includes a mention of an application may be transmitted to and/or stored at the server(s) in addition to transmitting the data to the application integrated into the communication platform. In some examples, applications integrated into the channel may be mentioned or called using a unique application call signal (e.g., a back-slash, a hyphen, an exclamation point).

The communication data 130 may additionally or alternatively include a command; a command may be a specialized message sent via a channel or direct message that includes a command identifier, which may be symbol such as a forward slash, exclamation point, tilde, or the like. The symbol may be used to provide a shortcut for performing specific operations via the client communication application and/or identify a message and/or file as being intended for an API of the host communication application and/or an application integrated into the communication platform. In some instances, the symbol may differ depending on the feature to which the command is to be provided and, in some examples, the command may. Commands may additionally or alternatively address a bot.

In some examples, the communication data 130 may comprise data associated with a user (i.e., a user profile), including, but not limited to, a user identifier, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., Alice Tyler), a username (e.g., alice_t), a password, user preferences and/or settings, a time zone, a status, a token, and the like.

In some examples, the datastore 128 may additionally or alternatively store permissions data associated with permissions of individual users of the communication platform. In some examples, permissions can be set by the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, an account or profile associated with the user data. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

The datastore 128 may additionally or alternatively store workspace data, which may be part of the communication data 130. In at least one example, the communication platform can be partitioned into different workspaces, which can be associated with different groups of users. Each workspace can be associated with a group identifier and one or more user identifiers can be mapped to, or otherwise associated with, the group identifier. User(s) corresponding to such user identifier(s) can be "members" of the group. A workspace may comprise one or more channels that are unique to that workspace and/or one or more channels that are shared between one or more workspaces. In some examples, workspaces can be associated with one or more organization identifiers, which can be associated with organizations or other entities associated with the communication platform. In some examples, such data can be mapped to, or otherwise associated with, other types of data in the datastore 128 (e.g., user data, permission data, channel data).

The datastore 128 may additionally or alternatively store channel data, which can be part of communication data 130. Channel data may store data associated with individual communication channels. In at least one example, the host communication application can establish a communication channel between and among various user computing devices, allowing the user computing devices to communicate and share data between and among each other. In at least one example, a communication channel identification may be assigned to a communication channel, which indicates the physical address in the datastore 128 where data related to that communication channel is stored. A communication channel may be "public," which may allow any user within an organization (e.g., associated with an organization identifier) to join and participate in the data sharing through the communication channel, or a communication channel may be "private," which may restrict data communications in the communication channel to certain users or users having particular roles (e.g., managers, administrators). In some examples, a communication channel may be "shared," which may allow users associated with different organizations (e.g., entities associated with different organization identifiers) to join and participate in the data sharing through the communication channel. Shared channels may be public such that they are accessible to any user of either organization, or they may be private such that they are restricted to access by certain users or users having particular roles from both organizations. In some embodiments, each organization may set different policies for data access and retention for its data in the shared channel.

In some examples, the datastore 128 may be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like. In some examples, data shards can improve the performance of the communication platform.

In some examples, individual organizations can be associated with a database shard within the datastore 128 that stores data related to a particular organization identification. For example, a database shard may store electronic communication data associated with members of a particular organization (i.e., communication data 130), which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared channel).

In some examples, a channel can be associated with a database shard within the datastore 128 that stores data related to a particular channel identification. For example, a database shard may store electronic communication data associated with the communication channel, which enables members of that particular channel to communicate and exchange data with other members of the same channel in real time or near-real time. In this example, a group or organization can be the owner of the database shard and can control where and how the related data is stored.

In some examples, at least one candidate generation component 136 may comprise the embedding component 124 discussed herein. There may be different candidate generation components 136. A candidate generation component may be configured to generate a candidate feature of the communication platform to propose to a user via a user interface 122 of the client communication application 118. In some examples, at least one of the candidate generation component 136 may use graph embeddings generated by the embedding component 124 and other candidate generation component(s) may generate candidates based at least in part on most recently and/or most frequently contacted users, semantic meaning of communication data (see U.S. patent application Ser. No. 16/875,933, the entirety of which is incorporated herein by reference), most-recently joined channels, overlap in channel membership, etc. In some examples, a candidate generation component may determine a probability associated with a candidate feature, where the probability indicates a likelihood that the candidate feature satisfies a target metric. The target metric may be binary or a real value. For example, the probability associated with a candidate feature, such as a channel, may indicate a likelihood that the user to which the candidate channel may be proposed will read and/or write one or more messages in the candidate channel or a specified number of messages, invite another user to the channel or a specified number of users to the channel, etc.

In some examples, at least one of the API(s) 120 may comprise a candidate ranking component 138 that may receive sets of candidate features from different ones of the candidate generation components 136. In some examples, a probability may be associated with each candidate feature, although some types of candidate generation components may not generate a probability in association with a candidate feature. In some examples, not all of the candidate generation component 136 may submit a set of candidate features responsive to every request at the API 120. For example, a request may be associated with a subset of the candidate generation components 136—a request generated based on a search query may trigger candidate generation components that generate candidates based on a semantic embedding, keyword search, channel membership, or the like, whereas a request generated based on a user joining a channel may trigger candidate generation components that generate candidates based on graph embedding, channel membership, and most-recently joined channels. Regardless, the candidate ranking component 138 may rank the candidate features received from two or more candidate generation components based at least in part on probabilities associated therewith and/or the request type. In an example where a single candidate generation component outputs a set of candidate features, the candidate ranking component 138 may be skipped since the single candidate generation component may rank its own output in some examples. In additional or alternate examples, the candidate ranking component 138 may rank output from a single candidate generation component.

In an additional or alternate example, ML model(s) 126 may comprise one or more ML model(s) (e.g., a single ML model, an ensemble of ML models) for predicting a candidate feature that is most likely to be selected by a user or that is most likely to satisfy a target metric. For example, the ML model(s) 126 may comprise an ML model that is part of a candidate generation component and that generates a probability associated with a candidate feature generated by the candidate generation component. In an additional or alternate example, the ML model(s) 126 may comprise an ML model that ranks candidate features received from one or more different candidate generation components 136. The training of such a model may allow the system to differentiate between candidate features that have a matching probability and/or one candidate feature and probability generated by a first candidate generation component and another candidate feature generated by a second candidate generation component that is not configured to generate probabilities. In some examples, such an ML model may be trained, at least in part, by whether a user selects or rejects (e.g., by not selecting or by dismissing) a proposal selected by the API 120 and presented to the user.

At least one of the API(s) 120 may select a subset of the output of the candidate ranking component 138 to propose to the user via the user interface 122. In some examples, such an API may request or be provided with dimensions of a portion of the user interface 122 for presenting the proposed features as a recommendation to a user. The presentation may comprise causing a display 140 of the computing device(s) 104 to present a selectable user interface element associated with a proposed feature. The API(s) 120 may also receive user input from the computing device(s) 104 indicting selection of one or more of the features that were proposed. Responsive to receiving this user input the API(s) 120 may cause one or more actions to occur at the host communication application 116, such as adding a user to a channel, adding user(s) as recipients for message, adding a file to a channel or workspace, or the like.

In some examples, the communication platform server(s) 102 may include communication interface(s) 142 and/or computing device(s) 104 may include communication interface(s) 144. Communication interface(s) 142 and/or 144 may include one or more physical and/or logical interfaces, such as hardware and/or software components, for enabling communication with various other devices, such as over the network(s) 106 or directly. In some examples, the communication interface(s) 142 and/or 144 can facilitate communication via Websockets, API calls, HyperText Transfer Protocols (HTTPs), etc. Additionally or alternatively the communication interface(s) 142 and/or 144 may enable Wi-Fi-based communication such as via frequencies defined by the IEEE 802.11 standards, short range wireless frequencies such as Bluetooth®, cellular communication (e.g., 2G, 2G, 4G, 4G LTE, 5G, etc.) or any suitable wired or wireless communications protocol that enables the respective computing device to interface with other computing device(s).

The communication platform server(s) 102 may further include input/output (I/O) device(s) 146 and/computing device(s) 104 may include I/O device(s) 148. Such I/O devices 140 and/or 142 can include a display, various user interface controls (e.g., buttons, a touch screen, keyboard, mouse, touch screen, joystick), audio speakers, connection ports, haptic or other tactile output devices, and so forth. For example, I/O device(s) 148 may be used by a user to indicate a selection or rejection of a proposed feature, according to the techniques discussed herein.

As illustrated in FIG. 1, the user interface 122 may present data associated with one or more communication channels and, in some examples, one or more workspaces. That is, in some examples, the user interface can expose features from multiple channels, workspaces, users, and/or applications into a single user interface so that the user (e.g., of the user computing device 104) can access and/or interact with these different features and/or communicate with other users associated with the different features. In some examples, the user interface 122 may comprise a first pane associated with a first region 150 of the interface that displays channels of which the user is a member and/or direct message channels with other user(s).

Additionally or alternatively, the user interface 122 may comprise a second region 152 of the user interface 122 that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), a virtual space associated with communication data transmitted over a channel). In some examples, the data feed can be organized and/or is sortable by workspace, time, type of action, communication channel, user, or the like. In some examples, such data can be associated with an indication of which user (e.g., member of the communication channel) posted the message and/or performed an action.

In some examples, the communication data presented at the user interface 206 may have been sent by one or more computing devices to communication platform server(s) 102. For example, the communication data received by the server(s) 102 and presented in the second region 152 may include a message, a file attached to that message, and/or reaction(s) to the message. The message may comprise text, metadata (e.g., time sent, time received, user identifier, channel identifier, workspace identifier, organization identifier), attachments such as files, links, and/or the like. The file could be any other type of file, such as a document, spreadsheet, computer code (e.g., batch file, executable, script, library, program, network packet capture, or the like). A reaction may include emojis (e.g., a "thumbs up" emoji in this case, although other reactions are contemplated), a prioritization or deprioritization of communication data (e.g., starring, pinning, archiving, assigning a retention window after which the communication data will be deleted), and/or the like. The user interface 122 may facilitate any of these actions along with any other interactions with the communication platform in additional to or instead of transmitting, presenting, and/or receiving communication data, such as modifications to communication data, archiving communication data, and/or deleting communication data.

The user interface 122 may additionally or alternatively comprise an interface element (e.g., visual display element, such as a button) for drafting a message, i.e., element(s) 154 and/or 156; creating a search query, i.e., element 158; creating a triage ticket, i.e., element 160; and/or joining a channel, i.e., element 162. A communication data entry element 164 may be configured to represent communication data entered and/or indicated by a user via I/O signals generated by the I/O device(s) 148 responsive to user input (i.e., collectively, "user input"). For example, the user may provide user input via the I/O device(s) 148 to draft a message, generate a search query, or the like and some of these interactions with the communication platform may be represented via element 164, although additional or alternate user interface elements are contemplated. Note that, although these elements are depicted as visual elements, they may be selectable or interacted with via voice, touch, gaze, I/O device output, and/or other user interactions. The client communication application 118 may include instructions to display a message drafting interface, a search query interface, or a triage ticket interface upon selection of any of these interface elements. Interaction with any of these or other elements or interfaces may create an API call that includes data that may be based at least in part on the interaction with the interface. This API call may be transmitted to communication platform server(s) 102 and may call functionality of the host communication application 116, embedding component 124, ML model(s) 126, candidate generation component(s) 136, and/or candidate ranking component 138 via the API(s) 120. Note that although this application discusses using API calls, any other suitable method of transmitting data or a request for data and responding to such data/requests may be used, such as a publish-subscribe (pub-sub) architecture.

While FIG. 1 is provided as an example system 100 that can be used to implement techniques described herein, the techniques described and claimed are not limited to being performed by the system 100, nor is the system 100 limited to performing the techniques described herein.

Example Graph Representation of Communication Platform Interactions

Figure 2A:
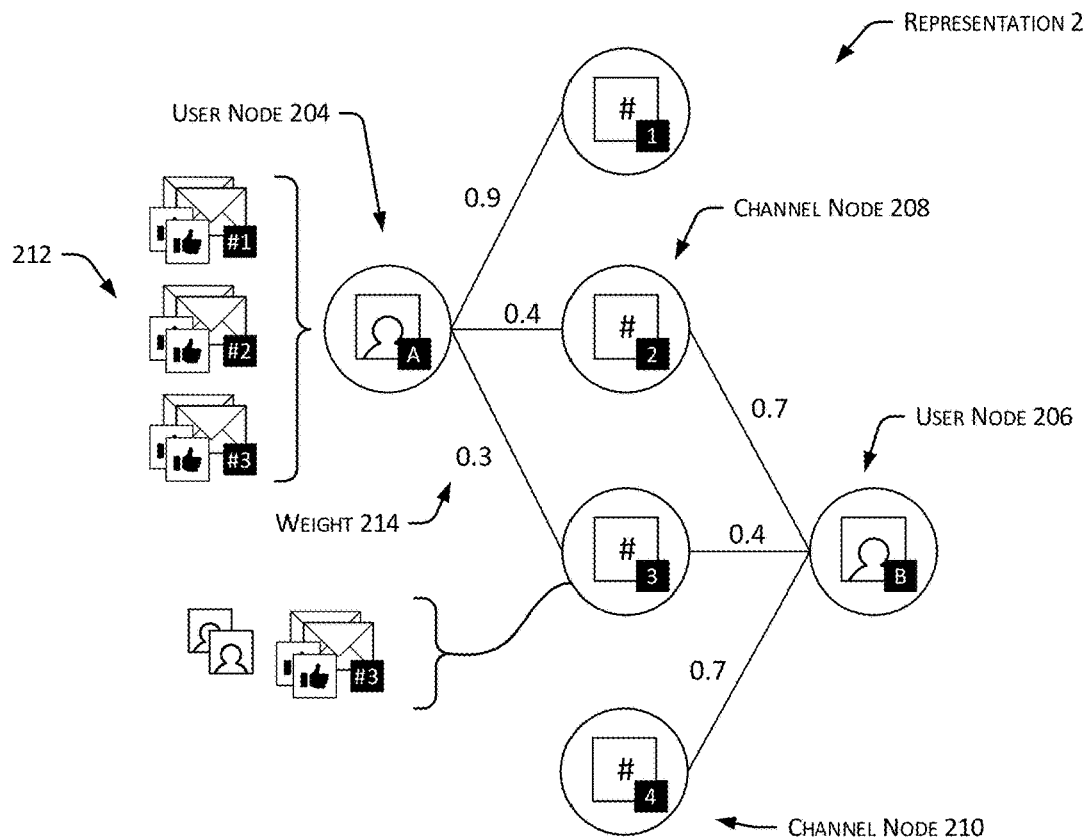
FIGS. 2A and 2B illustrate two example graph representations of interactions between features of a communication platform.
Figure 2B:
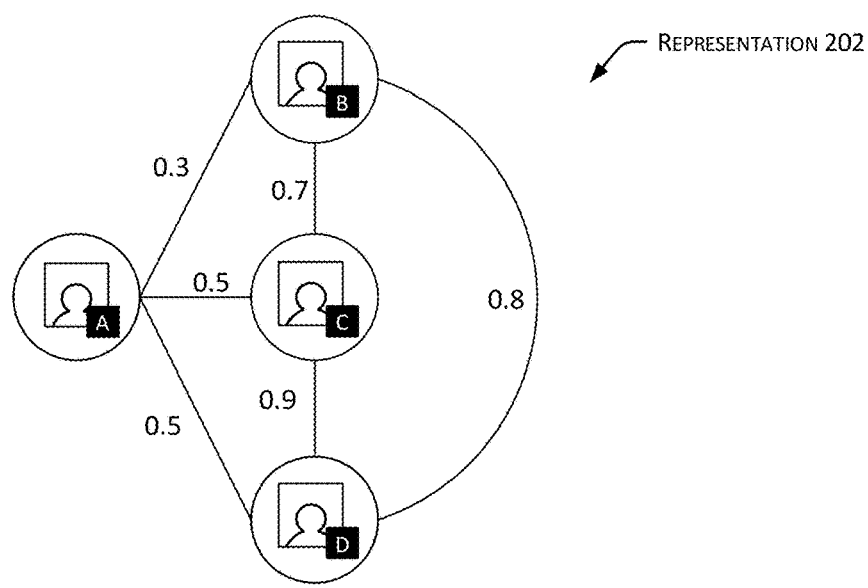

FIGS. 2A and 2B illustrate two different graph representations of interactions between features of a communication platform. For example, FIG. 2A illustrates an example representation 200 mapping interactions between user(s) and channel(s) and FIG. 2B illustrates an example representation 202 mapping interactions between user(s) and user(s). In some examples, example representation 200 and example representation 202 may be part of a same representation although, in an additional or alternate example, the representations may be separate representations. Additionally or alternatively, representations may be generated separately per feature or for a subset of features. For example, example representation 200 depicts an example of a representation generated for at least a subset of features (i.e., a subset of users, two users in the illustrated case), but example representation 200 could be modified to only represent the channels with which a first user interacts. Example representations 200 and 202 may be examples of an undirected graph, although other representation types are contemplated, such as a directed graph, relational database, etc.

In some examples, the embedding component may comprise a pre-processing component that generates or retrieves these representations or at least a part thereof. Generating the representation may be based at least in part on a set of generation parameters. The generation parameters may identify, among other things:
- a type of representation to be generated (e.g., graph, directed graph, undirected graph, regular graph, path graph, cycle graph, tree, forest, polytree, polyforest, relational database), an identification of the feature type to be mapped (e.g., user(s) to channel(s), user(s) to user(s), channel(s) to channel(s)),
- a type of the features to be mapped (e.g., map a subset of an organization, such as users identified by a label as being part of a finance team and the channels with which such users interact; map all the users of an organization; map a particular channel or subset of channels; map channels associated with a particular file or file type),
- an action that triggers a request and/or a type of request with which the representation is associated (e.g., user joining a channel, user adding recipients and/or mentions to a draft message, user beginning a search query, user adding a file, user transmitting communication data to a bot),
- a maximum number of edges and/or nodes,
- a time window associated with a type of representation and/or type of feature mapped by a representation (e.g., a first representation associating user(s) and channels may be generated in association with a first time window, such as communication data and/or interactions over the last three months or six months; a second representation associating user(s) and user(s) may be generated in association with a second time window, such as communication data and/or interactions over the last year; although any other time window is contemplated); and/or
- a threshold weight (e.g., edges associated with weights below the threshold weight may be deleted in some examples, although in other examples such edges may be kept), etc.

As discussed above, a pre-processing component of the embedding component (or another component that is entirely devoted to representation generation) may generate such a representation based at least in part on receiving a request or based at least in part on periodic updates to representation(s).

FIG. 2A illustrates an example representation 200 that may be a graph having a first dimension of nodes (or vertices) associated with users and a second dimension of nodes (or vertices) associated with channels. Edges, represented as lines, may indicate an association between a user and a channel and a weight associated with an edge may indicate a degree of interaction between the user and the channel. Example representation 200 may thereby represent two different users' interactions with four different channels, according to the techniques discussed herein. A first user is represented by node 204 and a second user is represented by node 206. The lines between user node 204 and three channel nodes (e.g., channel node 208 associated with Channel 2) may represent an association of user node 204 with the three channel nodes, Channel 1, Channel 2, and Channel 3. For example, User A, represented by the user node 204, may be a member of each of these channels, but may not be a member of Channel 4 or, despite having joined Channel 4, may not have interacted with Channel 4 sufficiently for an edge to be generated between user node 204 and channel node 210. In the latter example, a threshold weight associated with generation of the representation 200 may cause an edge between user node 204 and channel node 210 to not be generated or to be deleted.

Generating the representation 200 may comprise determining communication data 212 associated with a feature, which may be defined by the representation generation parameters. In the depicted example, such communication data 212 for generating a portion of the representation 200 associated with User A may comprise determining communication data, such as messages transmitted by, reacted to, and/or read by User A and one or more of the channels which User A has joined and/or otherwise interacted with. For example, communication data 212 represents any such communication data associated with Channels 1-3.

In at least one example, a graph representation identifying user(s)' interactions with channel(s) may comprise creating edges between a user node and the channel(s) that the user has joined based at least in part on a user's interaction(s) with a channel. Such interaction(s) may be based at least in part on communication data associated with the user and the channel. The component that generates the representation may determine a weight associated with an edge, where the weight indicates a degree of interaction between the user and the channel indicated by the edge. In the depicted example, the weights are values between 0 and 1, although any other value may be used/determined (e.g., logit, floating value).

In some examples, an ML model may determine the weight associated with an edge based at least in part on communication data associated with the user and the channel (e.g., both communication data addressed to the user over the channel and communication data transmitted by the user over the channel) or communication data transmitted over the channel by the user and/or interacted with by the user (e.g., communication data transmitted by and/or interacted with by the user). In an additional or alternate example, the weights may be based at least in part on a metric such as a number of communication datum read, opened, deleted, archived, and/or transmitted by the user associated with the channel; a number of reactions/interactions made by the user associated with the channel (e.g., a number of reactions the user has made to communication data, such as files, messages, etc. in the channel), a number of users the user has invited to the channel; and/or any other indication of a degree of interaction between features. Such a value may be normalized based at least in part on other interactions in the same channel (e.g., by other users, which may or may not include a bot or application), other interactions across a subset of users having a same identifier (e.g., users having a same permission level, users having a same team identifier), other interactions across an organization, etc.

For example, User A's interaction(s) with Channel 3 may be represented by an edge and associated with the weight 214 "0.3," which may indicate a relatively low level of interaction where a lower value of the weight indicates less interaction. By contrast, User A's interaction with Channel 1 may be significantly higher, as indicated by the weight value "0.9." User A's interaction with Channel 4 may be non-existent or may not meet or exceed a threshold level of interaction sufficient for creation of an edge between user node 204 and channel node 210 associated with Channel 4. For example, User A may have never joined Channel 4 or joined Channel 4 and never read, transmitted, or reacted to any communication data in Channel 4 or only read, transmitted, or reacted to a small enough amount of communication data that such interaction did not meet a threshold weight and/or interaction amount.

FIG. 2B illustrates an example representation 202 that may be a different representation than example representation 200 or may be a different portion of a same representation that includes representation 200. Representation 202 may comprise similar features and methods of generation to representation 200, except that the representation parameters for generating representation 202 may map user(s)' interactions with other user(s) instead of or in addition to mapping user(s)'s interactions with channels. To generate representation 202, the representation generation parameter(s) may specify the same or different communication data from user-to-channel representations to retrieve to determine the weights and edges between user nodes. For example, user-to-user representations may comprise identifying a frequency that a direct message is transmitted, read, or reacted to between two users or that communication data comprises a mention by a first user of a second user, etc. This may stand in contrast to some other representation types, such as user-to-channel representations, since direct messages are separate from channels in the communication platform.

Although representation 202 is depicted as an undirected graph, a user-to-user graph may be a directed graph that indicates a frequency or quality of a direction of interactions between users. For example, a directed graph representation of user-to-user interactions may include a first directed edge and first weight indicating a frequency with which a first user transmits communication data to a second user and a second directed edge and second weight may indicate a frequency with which the second user transmits communication data to the first user. Directed graphs may be useful for examples where there may be a disparity between the interactions, such as for user-to-user interactions, user-to-application interactions, etc., although undirected graphs or other representations may be used. As specifically regards a user-to-user representation, a weight associated with an edge between two user nodes may be based at least in part on a number of direct message conversations that both users are part of; a number of communication datum transmitted to/from/between, reacted to, and/or ready by one or both of the users; a number of mentions of one of the users by the other user; a number of times that a first user is added to a conversation that includes a second or third user; etc. In an additional or alternate example, an ML model may determine the weight from any of the communication data discussed herein. In some examples, the graph may be a type that includes a single edge that identifies multiple users, so that the edge can indicate a frequency with which a set of users are identified as recipients for communication data.

Example Process for Embedding Creation and Uses Thereof

Figure 3:
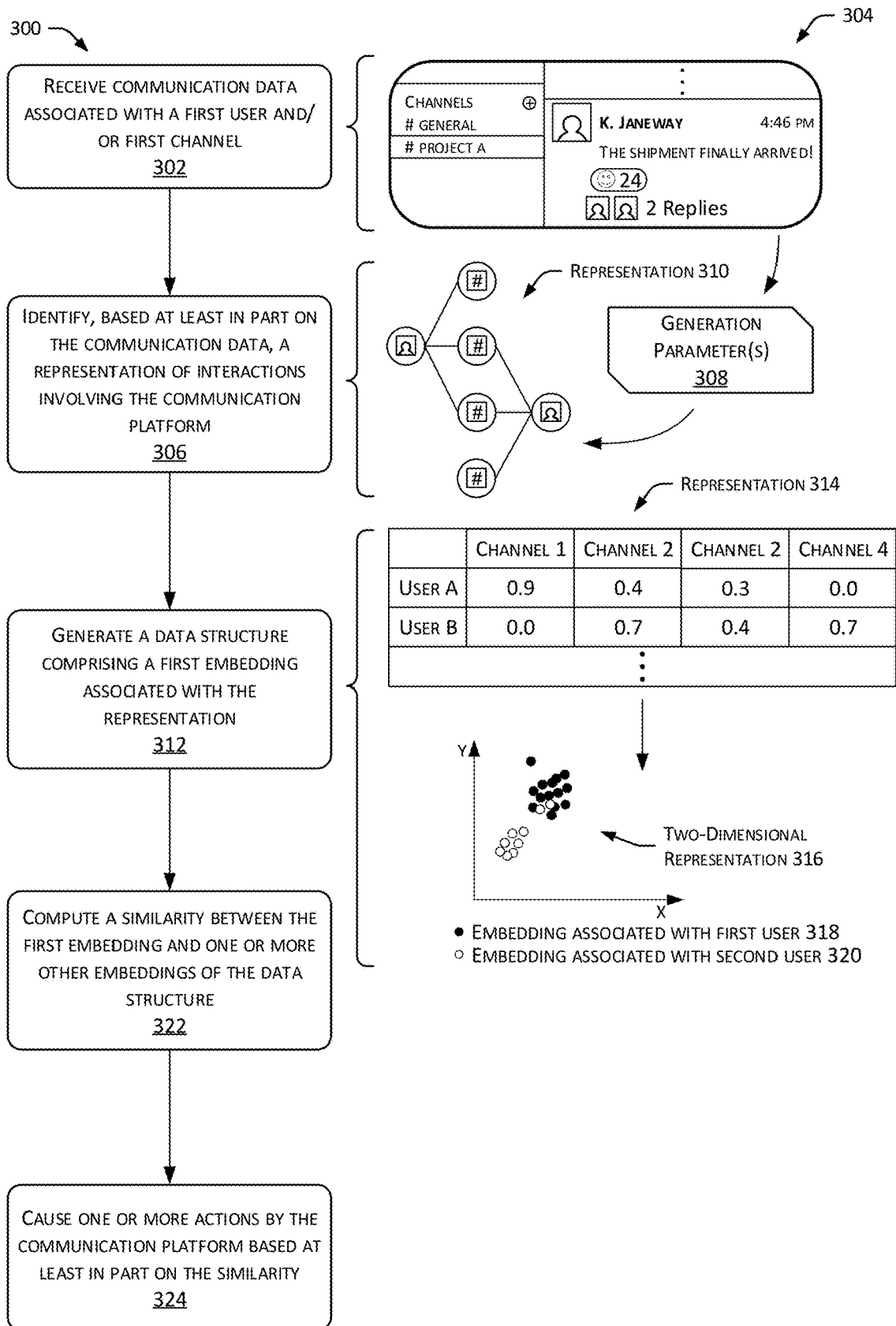
FIG. 3 illustrates a pictorial flow diagram of an example process for determining a representation of interactions of one or more users with one or more channels of the communication platform and generating graph embedding(s) based at least in part on the representation.

FIG. 3 depicts a flow diagram of an example process 300 for generating graph embeddings associated with interactions between features of a communication platform. Although the term "graph embeddings" is used herein, it is understood that the embeddings discussed herein are an embedding of at least a portion of the representations generated according to the techniques discussed herein that detect and capture interactions between features of the communication platform—such representations may be a different or additional type of representation other than a graph. The term "graph embedding" may therefore include embeddings of at least a portion of a relational database, table, matrix, or any other type of representation. In various examples, example process 300 may be carried out by communication platform server(s) 102, although in some examples user computing device(s) 104 may provide or receive at least some of the data and instructions discussed and/or may perform one or more of the operations instances where the processing is partially or completely distributed to user computing devices.

At operation 302, example process 300 may include receiving communication data from one or more user computing devices, according to any of the techniques discussed herein. In at least one example, the communication data may be associated with a first user and/or a first channel. Operation 302 may be conducted in real-time or substantially real-time. In other words, the server(s) 102 may receive the communication data as it is created and/or transmitted by a user computing device or close-in-time thereto. For example, the communication data may be received in association with an API call/request generated responsive to detecting an interaction within the communication platform. In some examples, at least one API may receive communication data from a computing device associated with a user and generate a detection based at least in part on a rule set configured to detect certain interactions. The detection may be used to generate a request specifying one or more candidate generation components and/or one or more representation and/or embedding types. This request may cause the identified candidate generation components to (potentially each) identify a set of candidate features for proposal to a user. In some examples, at least one of the candidate generation components may be a candidate generation component that uses graph embeddings. In such an example, the request may further identify a type of the request or a type of representation upon which the graph embedding should be based.

In an additional or alternate example, operation 302 may be part of a batch processing operation conducted by an embedding component. For example, the embedding component may receive the communication data based at least in part on requesting the communication from the data store as part of offline generation of a batch of embeddings for those portions of communication data associated with a time period (e.g., the last day, the last week, the last month). In some instances, such batch generation may merely sample communication data of different types to generate the embeddings although in other examples all of the communication data may have an embedding generated and associated therewith.

In some examples, the communication data may be received or retrieved in association with a particular communication platform feature, such as a user profile (operation 302(1)), a channel (operation 302(2)), a ticket (operation (302(n)), or the like. For example, operation 302 may comprise (302(1)) receiving or retrieving one or more messages, interactions, threads, and/or mentions associated with a user; (302(2)) receiving or retrieving one or more messages, interactions, mentions, and/or files associated with a channel; (302(n)) receiving one or more messages, channels, mentions, and/or files associated with a ticket; and/or the like. FIG. 3 depicts a simple illustration of receiving a message 304 from a user computing device sent by K. Janeway via the channel "Project A."

At operation 306, example process 300 may include identifying, based at least in part on the communication data, a representation of interactions involving the communication platform. Operation 306 may include generating the representation according to generation parameter(s) 308 and based at least in part on the type of request received. A set of generation parameter(s) 308 may be associated with a particular type of request or may be identified by a request, as discussed above. The generation parameter(s) 308 may define the type of representation generated, the features and/or interactions upon which the representation is based, etc. The depicted example representation 310 identifies a user's interaction with one or more channels, although, as discussed above, additional or alternate representations may be determined. Moreover, the depicted example is an example of offline processing of communication data to generate a representation. For example, operation 306 may comprise determining a number and/or type of interactions K. Janeway has had with the channel "Project A," including K. Janeway's most recent message (i.e., message 304) about a shipment. Operation 306 may comprise updating the representation with any communication data associated with K. Janeway and the channel "Project A" since a last update to the representation was made. Such an update may have occurred responsive to a request triggered by a detected action (e.g., joining a channel, drafting a direct message) or at a last periodic offline update. Representations may be generated to indicate a degree of interaction between any features of the communication platform, such as users, teams of users, channels, files, workspaces, emojis, reactions, and/or the like. For example, the representations may indicate a degree of activity/interaction between a user and channel(s), a user and user(s), channel and channel(s), channel and user(s), user and file(s), file and user(s), file and channel(s), channel and file(s), channel and emoji(s), or the like.

At operation 312, example process 300 may comprise generating a data structure comprising a first embedding associated with the representation, according to any of the techniques discussed herein. Operation 312 may comprise generating an embedding associated with at least part of the representation 310. For example, operation 312 may comprise determining, as the first embedding, a single value decomposition (SVD) for a portion of a graph associated with a first user. Representation 310 may be transformed or otherwise represented in tabular form as representation 314. The data structure may comprise different embeddings per user in an example where the representation maps users to channels. In an additional or alternate example, the representation may be inverted before the embedding is generated so that the embedding maps a channel to the users interacting with the channel. In at least one example, a different data structure may be generated for different representations, although in some examples, two data structures associated with two different representations may be combined. For example, labels, reference identifiers, an indication of directionality, and/or the like may be appended or associated with the first embedding. For example, a first embedding stored as part of a first data structure may be associated with a first identifier associated with a first user, a second identifier associated with a first channel, and a first direction from the user to the channel; a second embedding stored as part of a second data structure may be associated with the first identifier, the second identifier, and a second direction from the channel to the user; a third embedding stored as part of a third data structure may be associated with the first identifier associated with a first user, a third identifier associated with a second user, and a third direction from the first user to the second user; etc.

In some examples, determining an embedding associated with a representation may differ based on the type of representation and/or the underlying features and interactions represented by the representation. For example, links and/or files may require one or more steps of pre-processing in some instances, such as unfurling a link, conducting natural language processing or image recognition, classifying and/or summarizing content, identifying salient or key portions, etc. These pre-processing steps may be accomplished by deterministic and/or ML algorithms. In some instances, a type of the communication data may be included as part of the input data to the embedding algorithm. For example, input data to the embedding algorithm for generating an embedding associated with a triage ticket may include a channel in which the ticket was submitted and/or a channel identified by the ticket, a classification generated by an ML model based on a screenshot provided with the ticket, a frequency with which a same or similar ticket has appeared in the same channel or another channel, and/or an identification of a user that reacts to or resolves the ticket.

In some examples, the embedding itself may be a tensor, vector, and/or the like and may comprise many dimensions (e.g. 4 dimensions, 32 dimensions, 64 dimensions, 256 dimensions, 514 dimensions, 1024 dimensions, although more or less dimensions are contemplated). For simplicity, FIG. 3 depicts a two-dimensional representation 316 of embeddings that were generated in association with a first user over a first time period. To depict the embeddings in two-dimensions the embeddings may be projected form the embedding space to the two-dimensional space. The depiction includes embeddings associated with interactions associated with a first user 318, depicted as filled circles; and embeddings associated with interactions associated with a second user 320, depicted as unfilled circles. However, in an example where the embeddings are SVDs of portions of the representation, such a two-dimensional representation 316 may be unlikely to appear as orderly as embeddings 318 and 320 in a two-dimensional space.

Operation 306 may additionally or alternatively comprise determining and/or associating multiple embeddings with a particular feature (e.g., where each of the embeddings represents a different type of interaction or a different feature with which the particular feature is interacting). In some examples, the multiple embeddings may be different based at least in part on being produced by different embedding algorithms, being produced by a same embedding algorithm with different parameterizations (e.g., two embeddings produced by a same embedding algorithm but using different parameters to generate the two embeddings), being generated in association with different time frames (e.g., first embedding(s) associated with a first time frame, second embedding(s) associated with a second time frame), and/or the like.

At operation 322, example process 300 may comprise computing a similarity between the first embedding and one or more other embeddings of the data structure. In some examples, operations 302, 306, and/or 312 may be conducted as either offline or online operations, whereas operations 322 and 324 may be online operations. In other words, operations 302, 306, and/or 312 may be conducted as part of batch processing to create representation(s) and/or embedding(s) for rapid retrieval responsive to a request so that the representation(s) and/or embedding(s) may be minimally updated or may be pre-computed so that the server(s) need not compute them responsive to a request, which may allow operation(s) 302, 306, and/or 312 to be accomplished at more advantageous times when a the server(s) aren't experiencing as much traffic/load.

In at least one example, operation(s) 322 and/or 324 may be responsive to receiving a request from an API. That request may be generated based at least in part on detection of an activity of interest by the API (or another API), such as a user joining a channel, starting to draft a message to other user(s), starting to type a search query, and/or the like. The request may be associated with or identify a representation and/or the embedding(s) associated therewith. Operation 322 may comprise identifying the appropriate representation based at least in part on the representation type and/or features specified thereby. For example, identifying the appropriate representation may comprise retrieving the representation from memory, updating the representation if a portion is missing (e.g., a portion associated with a user identified by the request, which may occur if the user has joined the communication platform after the last periodic update to the representation), and/or generating at least a portion of the representation. Once the representation is identified, operation 322 may additionally or alternatively comprise identifying one or more embeddings associated with at least a portion of the representation associated with the request. Identifying the one or more embeddings may comprise generating embedding(s) associated with the portion of the representation (if such embedding(s) haven't been precomputed) and/or retrieving precomputed embedding(s). The portion of the representation may be identified based at least in part on the request. For example, if a user just joined a channel, the portion may be a portion of a channel-to-channel representation associated with the channel that the user joined (e.g., which may be used to identify which channels are similar to that channel) or a portion of a channel-to-user representation associated with the channel that the user just joined (e.g., which may be used to identify users that interact similarly with the channel or channels similar to a user's pattern of use).

In at least one example where the embeddings are generated using SVD, determining the similarity between the first embedding and another embedding may be based at least in part on a dot product of the first embedding with the other embedding. In additional or alternate examples, a distance between the embeddings in the embedding space may be determined. Operation 322 may additionally or alternatively comprise ranking features based at least in part on the similarity and identifying a top n number of features according to the similarities associated therewith, where n is a positive integer.

Put simply, operation 322 may be used to identify channels that a user might be interested in joining, based on the user's pattern of interactions with the communication platform or based on a channel that the user just joined; users that a user might be interested in contacting based at least in part on a channel the user just joined or based on one or more channels the user has joined/a pattern of interaction with such channels; channels that may be similar to a particular channel (e.g., a channel that a user just joined); file(s) that may be relevant to a user based on user(s) and/or channel(s) that a user interacts with; etc.

At operation 324, example process 300 may comprise causing one or more actions by the communication platform based at least in part on the similarity, according to any of the techniques discussed herein. Operation 324 may comprise causing presentation of one or more recommendations at a computing device associated with a user. The presentation may comprise a selectable element of a user interface, such a graphical user interface element that may receive user input, an audio presentation, or the like. The recommendations may be based at least in part on the top n number of candidates generated according to operation 322. Receiving user input corresponding with one of the recommendations may cause one or more actions at the communication platform. For example, the actions may include adding a user to a channel, inviting another user to a channel, adding a user as a recipient of a direct message or as a mention in an in-channel message, etc.

To give a variety of non-limiting examples of the actions accomplished at the communication platform, in at least one example, operation 322 may include causing a communication associated with the first user to be associated with a second channel based at least in part on determining a first similarity between the first embedding and a second embedding of the data structure. For example, the communication may be a draft message generated at the first user's computing device and the second embedding may be associated with the second channel. In an additional or alternate example, operation 322 may include causing the first user to be added to the second channel based at least in part on determining a second similarity between the first embedding and a third embedding. In yet another example, operation 322 may include causing the communication associated with the first user to be associated with a second user based at least in part on determining a third similarity, the third similarity being based at least in part on a fourth embedding that is associated with the communication. For example, the communication may be a draft direct message and the third embedding may be associated with the second user. Associating the second user with the communication may include identifying the second user as a recipient for the communication.

Figure 4A:
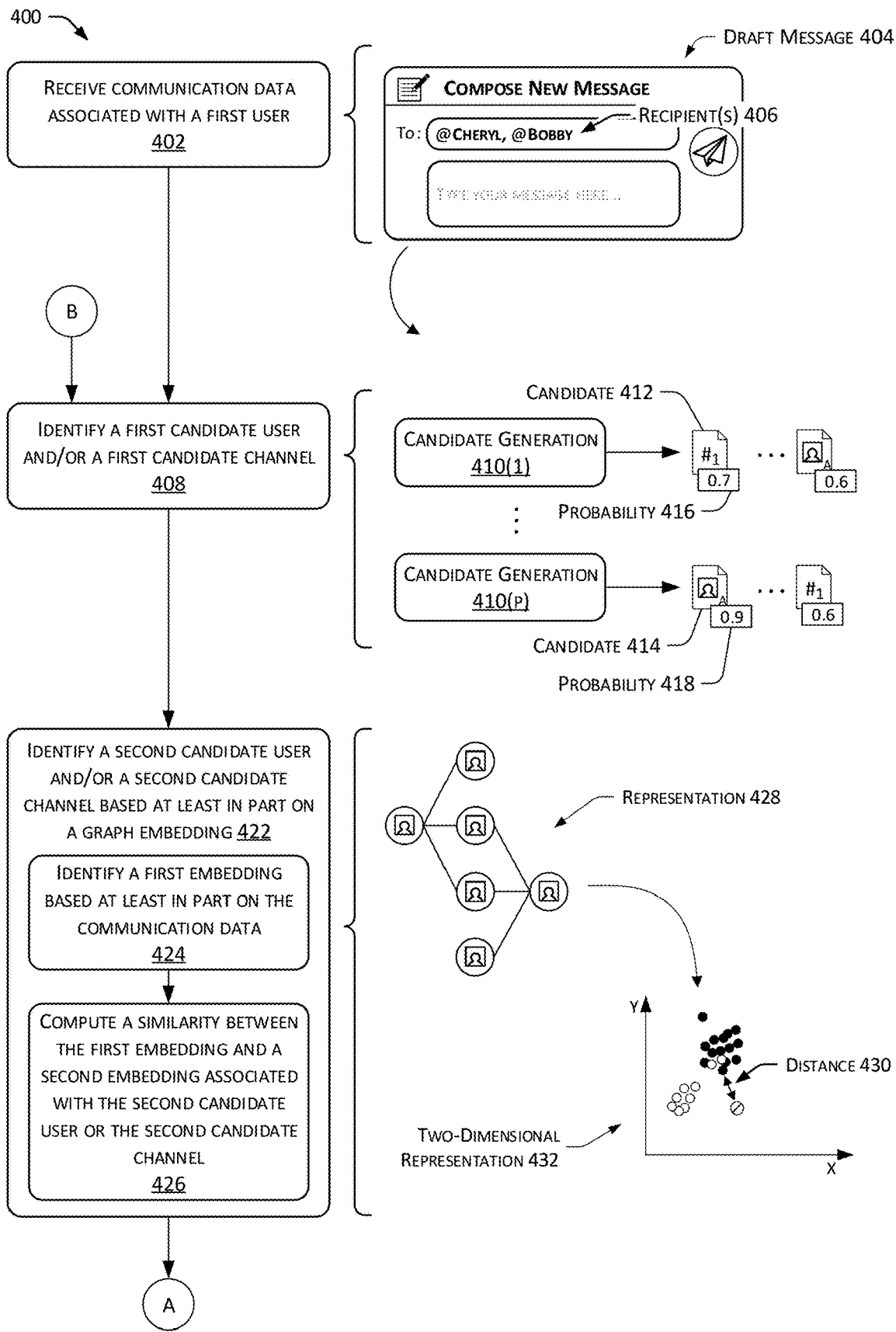
FIGS. 4A and 4B illustrate a pictorial flow diagram of an example process for identifying a candidate for inclusion in an activatable display from among multiple candidates proposed by disparate candidate generation systems.
Figure 4B:
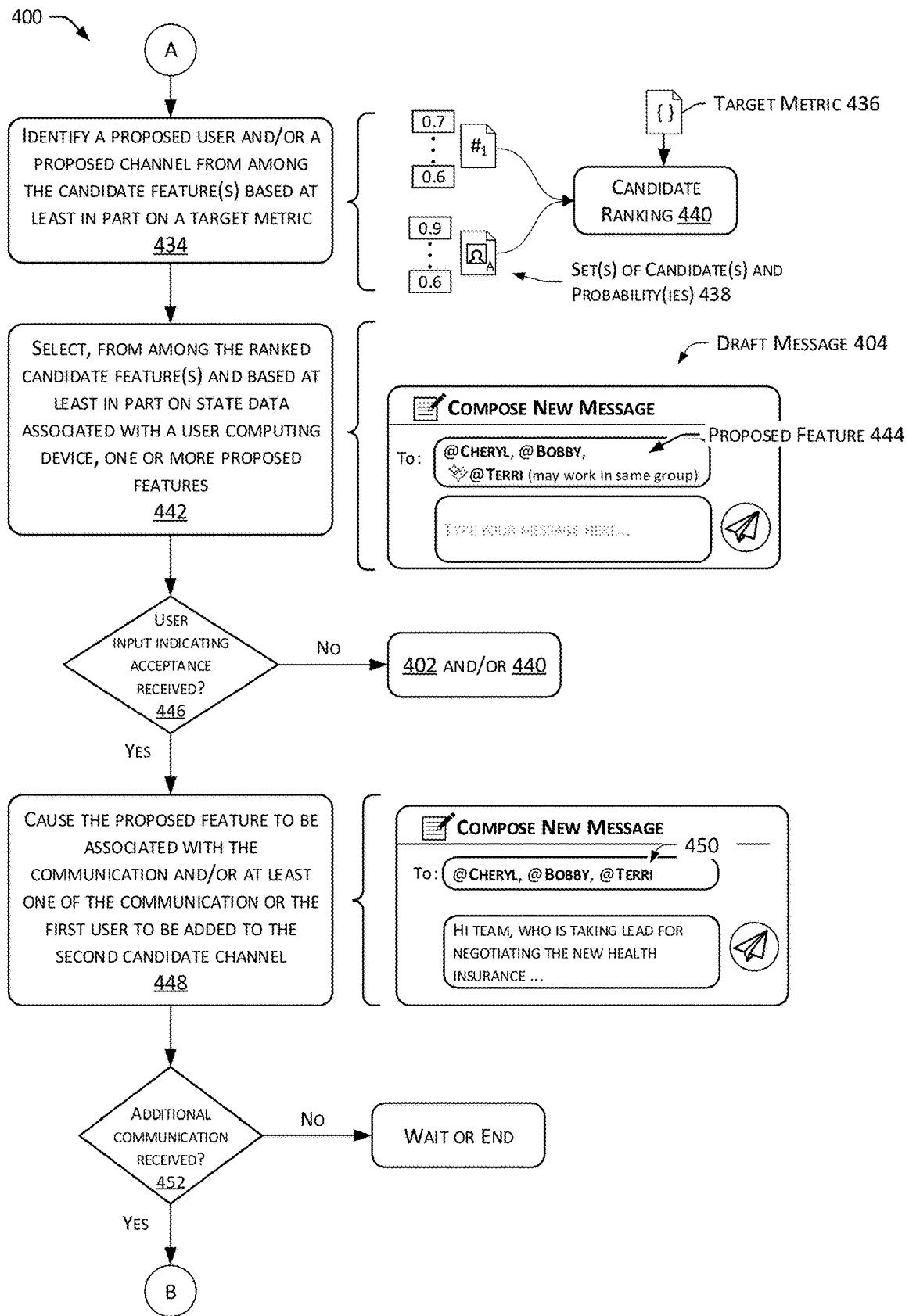

Ultimately, example process 300 may expose features of a communication platform that may have gone undiscovered by a user. The graph embeddings generated by example process 300 may characterize patterns of interaction such that the graph embeddings could be used to identify similar or relevant features even if the content of communications associated with the features was identical. In other words, to take the user-to-channel representation as an example, if users were only capable of sending a message that said "Hello" and nothing else but could choose the channels they joined and sent such a message in, the graph embeddings would provide a means of comparing the similarity of interaction patterns to differentiate between users and channels so that a user could discover and use channels or contact users that would be relevant to the user. Example process 300 may thereby reduce the number of redundant channels, Example Process for Candidate Feature Generation and Proposal FIG. 4 depicts a flow diagram of an example process 400 for generating candidate features and for selecting a subset of candidate features for proposal to a user. In some examples, an API of server(s) 102 may conduct all or part of example process 400 although one or more other component(s) of the server(s) 102 may accomplish some of the operations. A feature may include any of a variety of communication platform features such as, for example, a user, channel, file, etc. A candidate feature may include a feature identified by a candidate generation component for potential proposal to a user. A proposed feature may include a candidate feature selected by an API for presentation to a user via a user interface of a computing device associated with the user.

Example process 400 may be implemented for a system that comprises multiple candidate generation components, although some of the operations discussed as being part of process 400 may be operations that may apply to a system that has a single candidate generation method or a situation for which only one candidate generation component generated a set of components. Example process 400 may overcome the difficulties caused by the proliferation of computational systems that independently generate candidate features. For example, two different candidate generation components may associate a same probability with two different features or one or more types of candidate generation components may not generate a probability in association with a candidate.

At operation 402, example process 400 may comprise receiving communication data associated with a first user, according to any of the techniques discussed herein. Operation 402 may include receiving a draft message 404, a message, a file, a query, a channel joined notification, a new channel created notification, or the like from a computing device associated with the first user. In some examples, the communication data may be an event detected by an API or may be associated with a request. In some examples, the API may generate a request responsive to detecting the event and may generate an API call to one or more candidate generation components depending on a type or specifications of the request. The API call to the candidate generation component(s) may cause the candidate generation component(s) to each generate a set of candidate features. In an example where the communication data comprises a draft message 404, the API may call candidate generation components that output a channel that the message could be posted in and/or a user the message could be addressed to, although the API may select channels and/or users from the output of candidate generation components instead of limiting the candidate generation component(s) called. In another example, where the communication data comprises an indication that a user joined a channel, the API may call candidate generation component(s) that may generate a candidate file to post in the channel, a candidate user to mention in a message in the channel or a candidate user to invite to the channel, a candidate channel the user may be interested in additionally joining, etc.

In some examples and from the perspective of the user computing device, sending the message, receiving instructions to open the message composition dialog (e.g., which may lack association with a channel) and receiving data associated therewith, receiving instructions to open a search dialog and receiving a query associated therewith, drafting a message associated with a channel, receiving instructions to open a ticket, etc. may trigger the API call and may cause the first computing device to send at least a fragment of data associated with the action that triggered the API call. For example, the data fragment may comprise recipient(s) 406 identified for a draft message, text associated with a message, and/or the like. In some examples, the operations conducted herein may be conducted using such a data fragment. For example, upon entering identifying one or more or two or more users as recipients of a message, such as the users identified by "@Cheryl" and "@Bobby" in FIG. 4 at 406, the user's computing device may transmit a data fragment and/or API call to the API.

At operation 408, example process 400 may comprise identifying a first candidate user and/or a first candidate channel based at least in part on the communication data, according to any of the techniques discussed herein. For example, the first candidate user and/or first candidate channel may be a candidate feature received from a candidate generation component responsive to an API call/request. Operation 408 may comprise receiving a set (i.e., one or more) candidate features generated by one or more candidate generation components 410(1)-(p), where p is a positive integer indicating the number of candidate generation component(s) from which the API receives sets of candidate features. For example, a first set of candidate features received from candidate generation component 410 (1) may comprise a first candidate 412, which is a first channel in the depicted example, and a second set of candidate features received from candidate generation component may comprise candidate 414, which is a user in the depicted example.

The different candidate generation components may comprise different hardware and/or software components compared to each other for determining candidate features for proposal to a user. For example, the different candidate generation components may determine candidate features based at least in part on a semantic meaning of a message (see U.S. patent application Ser. No. 16/875,933, the entirety of which is incorporated herein by reference), a most-commonly contacted group of users, recently-joined channel(s), recently-contacted users, or channel membership overlaps, etc.

In some examples, a candidate generation component may determine a probability associated with a candidate. For example, candidate generation component 410(1) may determine a probability 416 associated with candidate 412 and candidate generation component 410(p) may determine a probability 418 associated with candidate 414. The probability may be different depending on the type of candidate generation component, but the probability may be a likelihood (e.g., a posterior probability) that a user will select the candidate (if the candidate is proposed to the user), a similarity of the candidate to communication data identified by the request, and/or a likelihood that the candidate satisfies a target metric. The target metric may be used by a candidate generation component to generate probabilities and/or the target metric may be used by the API to select features from among set(s) of candidate features for proposal. In some examples, the target metric may be identified as part of the request and may be based at least in part on a type of the request/an event that triggered the request.

Satisfying a target metric may include meeting or exceeding a threshold or indicating a higher value than other candidate features, as ranked according to the target metric. The target metric may include one or more metrics, which may be combined or used individually as part of a linear optimization algorithm, such as a number of messages read and/or transmitted, a number of users that the user may invite to the channel, a number of files that a user will open and/or upload to a channel, whether a user is an appropriate entity to include in a multi-party direct message, a percentage or number of messages to which a user will respond in a channel, and/or the like. For example, a candidate generation component may use a linear optimization, ML model, and/or deterministic factors to determine a likelihood that a candidate feature will meet or exceed or maximize one or more of the communication platform features discussed above. Although the examples given above may include any positive integer, the target metric may be re-cast as a binary indication, such as whether or not a user will invite any other users to a channel, whether or not a user will upload or open any files, whether or not a user will pin/star a communication, etc.

Note that in the depicted example, candidate generation component 410(1) and candidate generation component 410(p) generated sets of candidate features that include at least two candidate features that match (i.e., channel 1 and user A) but the candidate generation components assigned different probabilities to the respective candidate features. For example, candidate generation component 410(1) assigned a probability of 0.7 to Channel 1 and a probability of 0.6 to User A and candidate generation component 410(p) assigned a probability of 0.6 to Channel 1 and a probability of 0.9 to User A. This helps highlight the potential issues with receiving candidate features from multiple candidate generation components. If the candidate features proposed by candidate generation component 410(1) were taken alone, User A may seem a poorer candidate to propose than Channel 1 since it would be ranked lower based on the probabilities associated with the features, whereas candidate generation component 410(p) determined a rather high probability associated with User A that exceeds the probability 416 by over 28%, which is a significantly higher confidence.

At operation 422, example process 400 may comprise identifying a second candidate user and/or a second candidate channel based at least in part on a graph embedding, according to any of the techniques discussed herein. Note that, although the example discussed herein identifies a candidate user and/or a candidate channel for simplicity, any other feature of the communication platform may be identified as a candidate (e.g., a file, workspace, emoji, reaction). Operation 422 may be included in example process 400 in instances where one of the candidate generation components is a candidate generation component that uses/generated graph embeddings. In an example where the request generated by the API is not associated with or identifying such a candidate generation component, operation 422 may be skipped. Operation 422 may comprise operation(s) 424 and/or 426, which may be carried out by a candidate generation component that uses/generates graph embeddings.

Operation 424 may comprise identifying a first embedding based at least in part on the communication data and/or request. For example, identifying the first embedding may comprise operation(s) 302, 306, and/or 312 or a portion thereof. In other words, operation 424 may comprise determining whether a graph embedding already exists that is associated with the communication data and/or request. In the illustrated example, this operation may comprise determining whether an embedding associated with the first user exists and/or is up-to-date. In some examples, determining whether an embedding is up-to-date may comprise checking a time stamp associated with one or more portions of a representation 428 upon which the embedding is based. If the time stamp is older than a predetermined amount of time, at least a portion of the representation upon which the embedding is associated may be updated and the embedding re-generated. Depending on whether the draft message 404 is a draft direct message or a draft message for posting in a channel, this determination may additionally or alternatively include determining whether a user-to-user and/or a user-to-channel graph embedding exists. For example, a user-to-user graph embedding may be used to determine additional user(s) to identify as recipients, whether as a recipient for a direct message or as a mention in a channel-posted message and user-to-channel graph embedding may be used to determine a channel in which to post the message, which may be ignored by a user wishing to message the recipient(s) using the direct messaging functionality of the communication platform.

If a graph embedding associated with the communication data and/or request doesn't exist or isn't up-to-date, a representation or portion thereof may be newly generated and/or updated and the embedding may be re-generated. Once the graph embedding has been generated, operation 426 may comprise computing a similarity between the first (graph) embedding and a second (graph) embedding associated with the second candidate channel and/or second candidate channel. For example, determining the similarity may comprise operation 322, which may comprise determining a dot product between the first embedding and the second embedding or a distance 430 between the embeddings, as depicted in the two-dimensional representation 432. For example, operation 422 may comprise determining a nearest n number of neighboring embeddings in the embedding space.

At operation 434, example process 400 may comprise identifying a proposed channel and/or a proposed channel from among the candidate feature(s) based at least in part on a target metric 436, according to any of the techniques discussed herein. Again, as noted above, in an additional or alternate example, the candidate features may include more or different types of features than just a user and/or a channel, so the proposed feature may include an additional or alternate type of feature, such as a file, workspace, emoji, reaction, and/or the like. Operation 434 may comprise providing the set(s) of candidate(s) and probability(ies) 438 received from the one or more candidate generation components to a candidate ranking component 440 as input. The candidate ranking component 440 may output a ranking of the candidate features, regardless of whether all the features were associated with probabilities. The candidate ranking component 440 may additionally or alternatively receive the target metric 436 as input and/or data associated with the request or the event that triggered the request. In some examples, the candidate ranking component 440 may comprise an ML model and/or an ensemble of ML models and example process 400 may additionally or alternatively comprise selecting an ML model or an ensemble of ML model(s) from among multiple ML models based at least in part on the request type and/or the target metric 436.

For example, different ML models may be trained to rank candidate features according to different target metrics—a first ML model may rank a candidate feature according to the feature's likelihood to increase the number of messages written or read by a user, a second ML model may rank a candidate feature according to the feature's likelihood to be shared/uploaded, etc. In some examples, the ML model(s) may determine, based at least in part on the trained structure of the ML model(s), a likelihood associated with a candidate feature and based at least in part on the target metric 436 and conduct a ranking of the candidate features based at least in part on the likelihoods determined by the ML model(s) or the ML model(s) may not explicitly output a likelihood and the output of the ML model(s) may, additionally or alternatively, be the ranking itself. In other words, according to the first example, a first type of ML model may output a probability associated with a candidate feature whereas the second type of ML model may output a position of the candidate feature in the ranking. In some examples, user selection or dismissal of a proposed feature may be used to re-train an ML model.

In an additional or alternate example, some of the probabilities associated with a same feature may be combined before, after, or instead of using the ML model output. For example, the probabilities received from different candidate generation components but associated with a same candidate feature may be aggregated using an average or a weighted average of the probabilities associated with the candidate feature. For example, four different candidate generation components may have output Channel 1 as a candidate feature, but one of the candidate generation components may not be configured to output a probability and the other three candidate generation components may have output various probability values associated with Channel 1. Aggregating the probabilities in such an instance may include assigning a weight to each of the outputs based at least in part on the request type. For example, a rule set may specify different sets of weights to use for different request types. These weights may be learned or the weights may be heuristically determined based on observation of which candidate generation components are more or less likely to generate a candidate feature that would be selected by a user.

In some examples, a weight set may be associated with a specific user and may be modified based at least in part on user selection or dismissal of proposed candidate features. For example, a weight associated with a first request type and a first candidate generation component may be increased if a user repeatedly selects proposed features that were candidate features output by the first candidate generation component.

At operation 442, example process 400 may comprise selecting, from among ranked candidate feature(s) and based at least in part on state data associated with a user computing device, one or more proposed features. Once the candidate ranking component 440 outputs the ranking, the candidate ranking 440 may provide the ranking and/or candidate features to the API. In some examples, the API may be configured to receive state data about and/or from the user's computing device and determine a portion of a user interface associated with the client communication application that may be used for presenting proposed feature(s) and a number, q, of proposed feature(s) that may fit in the portion, where q is a positive integer. For a graphical user interface, this may comprise determining dimensions of a portion of a display for displaying proposed features based at least in part on a state and/or type of the user's computing device (e.g., a dimension or number of pixels the client communication application is occupying, a size and/or resolution of the display) and a number of proposals that may fit in the dimensions. For an auditory user interface, the API may determine a length of time assigned for proposal features, which may dynamically change based at least in part on a number of other elements that are to be presented audibly, and a number of proposed features that may be presented within the length of time.

The state data may comprise, a manufacturer of the computing device, a dimension and/or resolution of a display, a window size associated with the client communication application, a size and/or dimension of region(s) of the client communication application, a menu and/or dialog open in the client communication application and/or sizes/dimensions associated therewith, a number and/or dimensions of other features already being presented according to other instructions (e.g., graphical user interface space devoted to displaying recipients of a message), etc. Once the API has determined the number of proposed feature(s) that may fit in the allotted portion of the user interface, the API may use select this number (q) of candidate features as the proposed features for presentation to the user. The API may transmit an identifier of the proposed feature(s) to the user's computing device with instructions to present the proposed features via a user interface associated with the client communication application.

For example, in the depicted example, there may only be space to display one proposed feature (as determined according to device state data). The proposed feature 444 in the depicted example is a user "Terri." In some examples, the candidate ranking component 440 may additionally or alternatively determine a reason a candidate ranking component is being suggested. For example, such as reason is displayed with the proposed feature 444, i.e., "(may work in same group)." The API may transmit instructions for presenting this reason based at least in part on the state data—e.g., if there is enough space to display such a reason. For example, the candidate ranking component 440 may determine a candidate generation component, from among multiple candidate generation components, that contributed most to the proposed feature 444 being selected. This may comprise determining which probability or weighted probability was greatest and the candidate generation component that generated it or may comprise providing the probabilities and candidate feature to another ML model trained for the task. In some examples, for a proposed feature that is presented based on output from a graph embedding candidate generation component, determining the reason may comprise determining a factor that contributed most to a weighted edge between the user and the graph embedding associated with the proposed feature. The weighted edges between nodes of a graph may be based at least in part on various interactions and determining this factor may comprise determining which interaction contributed most to the weight associated with the edge.

At operation 446, example process 400 may comprise determining whether a proposed feature has been accepted. For example, operation 446 may comprise receiving a selection, generated responsive to user input at a user interface, associated with the proposed feature. For example, the user may interact with the user interface to affirm acceptance of the proposed feature. Responsive to receiving user input indicating acceptance of the proposed feature, example process 400 may transition to operation 448. In some examples, the user interface may maintain the proposed feature until a time lapses or a condition, such as a dismissal, is detected. Upon receiving a dismissal of the proposed feature, example process 400 may transition to operation 402 and/or 440 (to re-determine a proposed feature). Such dismissal may come in the form of continued input from the user and/or a selection of an option to dismiss the proposed feature, in a non-limiting example.

At operation 448, example process 400 may comprise causing the proposed feature to be associated with the communication and/or for at least one of the communication or the first user to be associated with the proposed feature, depending on the example. For example, operation 448 may comprise associating a proposed user with a message (e.g., identifying the proposed user as a recipient for a direct message, as illustrated in FIG. 4 at 450; identifying the proposed user in a mention in a message; uploading a file to a channel; attaching a file to a message), adding the first user to a channel, associating a draft message with a channel, or the like. Note that operation 448 may depend on the request type and/or context for the proposal of the feature. For example, operation 448 may additionally or alternatively comprise inviting a proposed user to a channel, merging two channels, separating two channels, closing a draft new channel and adding a user to an existing channel instead of creating a new channel, etc.

At operation 452, the example process 400 may comprise determining that additional communication data has been received. In some examples, operation 452 may comprise receiving a second data fragment, such as a text body associated with a message. In at least a first example, operation 402 may have included receiving a first data fragment, such as an identification of one or more or two or more recipients. Upon receiving additional communication data, example process 400 may transition to operation 408 and/or 434. In other words, operation 452 may comprise detecting another event at the computing device, which may trigger a new request for additional or alternate candidate features. For example, a first request for candidate features may be generated based at least in part on detecting the event of identifying one or more users as recipients for a draft message and a second request may be based at least in part on detecting a user starting to type in the body of a message or attach a file to the message. According to such an example, the first request and the second request may differ in the candidate generation components identified by the requests. For example, the first request my identify at least a graph embedding candidate generation component and not a semantic embedding candidate generation component, but the second request may identify at least the semantic embedding candidate generation component and may also identify the graph embedding candidate generation component. Semantic embedding candidate generation components are discussed in more detail in U.S. patent application Ser. No. 16/875,933.

CONCLUSION

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

What is claimed is:

1. A method, implemented at least in part by a server computing device associated with a communication platform, comprising:
   receiving, via the communication platform, communications associated with a first user, wherein the communication platform includes a plurality of channels in which different sets of users are authorized to access and post messages;
   identifying, based at least in part on the communications, a representation of a set including at least a first channel of the plurality of channels or a second user with which the first user has interacted, via at least one channel of the plurality of channels, the representation comprising an identification of the first channel or the second user and a weight associated with the identification that indicates a pattern of interactions by the first user with the first channel or the second user;
   identifying, based at least in part on a first embedding associated with the representation, a second channel of the plurality of channels or a third user;
   determining that a likelihood of interaction by the first user with the second channel or the third user satisfies a target metric; and
   based at least in part on the likelihood of interaction satisfying the target metric, causing a communication, associated with the first user and sent via the communication platform, to be associated with the second channel or the third user.

2. The method of claim 1, further comprising at least one of:
   causing the communication associated with the first user to be associated with the second channel based at least in part on a similarity between the first embedding and a second embedding associated with a data structure, or
   causing the first user to be added to the second channel based at least in part on the similarity.

3. The method of claim 1, wherein causing the communication associated with the first user to be associated with the second channel or the third user is based at least in part on a similarity between the first embedding and a second embedding that is associated with the communication.

4. The method of claim 3, wherein the second embedding is based at least in part on at least one of a portion of a graph indicating a degree of interaction between each of the first channel, the second channel, the first user, and the second user.

5. The method of claim 2, wherein:
   receiving the communications is in response to the first user joining the first channel; and
   the method further comprises:
      in response to the first user joining the first channel, transmitting, to a computing device associated with the first user, a recommendation to join the second channel; and
      causing the first user to be added to the second channel responsive to receiving an acceptance of the recommendation.

6. The method of claim 3, wherein:
   receiving the communications comprises receiving a first fragment of a draft message indicating one or more users identified as recipients;
   the second embedding is based at least in part on a portion of the representation indicating a degree of interaction between the second user or the third user and at least one of channels or users;
   a third embedding is based at least in part on a second portion of the representation indicating interaction of the one or more users with the at least one of the channels or the users; and
   the method further comprises causing the communication to be associated with the second channel or the third user based at least in part on a second similarity between the third embedding and the second embedding.

7. The method of claim 6, further comprising:
   receiving a second fragment of the draft message comprising a text portion of the draft message;
   determining a first semantic embedding based at least in part on the text portion, the first semantic embedding being in a different embedding space than the first embedding, the second embedding, and the third embedding; and transmitting a recommendation to associate a fourth user with the draft message based at least in part on the first semantic embedding.

8. The method of claim 1, further comprising generating a data structure comprising the first embedding that is based at least in part on the representation, wherein:

identifying the representation comprises generating a graph comprising a first node associated with the first channel, a second node associated with the first user, and an edge associating the weight, the first node, and the second node; and generating the data structure comprises generating the first embedding based at least in part on the graph.

9. The method of claim 8, wherein the weight is based at least in part on at least one of:

a first number of communications presented to the first user via the first channel;

a second number of communications transmitted by the first user via the first channel;

a third number of files opened by or transmitted by the first user via the first channel;

a fourth number of communications associated with the first channel and reacted to by the first user; or a fifth number of users invited to the first channel by the first user.

10. A system comprising:

one or more processors; and a memory storing processor-executable instructions that, when executed by the one or more processors, cause the system to perform operations comprising:

receiving, via a communication platform, communications associated with a first user, wherein the communication platform includes a plurality of channels in which different sets of users are authorized to access and post messages;

identifying, based at least in part on the communications, a representation of a set including at least a first channel of the plurality of channels or a second user with which the first user has interacted, via at least one channel of the plurality of channels, the representation comprising an identification of the first channel or the second user and a weight associated with the identification that indicates a pattern of interactions by the first user with the first channel or the second user;

identifying, based at least in part on a first embedding associated with the representation, a second channel of the plurality of channels or a third user;

determining that a likelihood of interaction by the first user with the second channel or the third user satisfies a target metric; and based at least in part on the likelihood of interaction satisfying the target metric, causing a communication, associated with the first user and sent via the communication platform to be associated with the second channel or the third user.

11. The system of claim 10, wherein:

causing the communication associated with the first user to be associated with either the second channel or the third user comprises at least one of:

causing the communication associated with the first user to be associated with the second channel based at least in part on a first similarity between the first embedding and a second embedding of a data structure, or causing the first user to be added to the second channel based at least in part on the first similarity; or wherein causing the communication associated with the first user to be associated with the second channel or the third user is based at least in part on a second similarity between the first embedding and a third embedding that is associated with the communication.

12. The system of claim 11, wherein the second embedding is based at least in part on a portion of a graph indicating at least one of a degree of interaction between each of the first channel, the second channel, the first user, and the second user.

13. The system of claim 10, wherein:

receiving the communications is in response to the first user joining the first channel; and the operations further comprise:

in response to the first user joining the first channel, transmitting, to a computing device associated with the first user, a recommendation to join the second channel, wherein the recommendation is based at least in part on a first similarity between the first embedding and a second embedding; and causing the first user to be added to the second channel based at least in part on the first similarity responsive to receiving an acceptance of the recommendation.

14. The system of claim 11, wherein:

receiving the communications comprises receiving a first fragment of a draft message indicating one or more users identified as recipients;

the second embedding is based at least in part on a portion of the representation indicating a degree of interaction between the second user or the third user and at least one of channels or users;

the third embedding is based at least in part on a second portion of the representation indicating interaction of the one or more users with the at least one of the channels or the users; and the operations further comprise causing the communication to be associated with the second channel or the third user based at least in part on the second similarity between the third embedding and the second embedding.

15. The system of claim 14, wherein the operations further comprise:

receiving a second fragment of the draft message comprising a text portion of the draft message;

determining a first semantic embedding based at least in part on the text portion, the first semantic embedding being in a different embedding space than the first embedding, the second embedding, and the third embedding; and transmitting a recommendation to associate a fourth user with the draft message based at least in part on the first semantic embedding.

16. A non-transitory computer-readable medium storing processor-executable instructions that, when executed by one or more processors, cause the one or more processors to perform operations comprising:

receiving, via a communication platform, communications associated with a first user, wherein the communication platform includes a plurality of channels in which different sets of users are authorized to access and post messages;

identifying, based at least in part on the communications, a representation of a set including at least a first channel of the plurality of channels or a second user with which the first user has interacted, via at least one channel of the plurality of channels, the representation comprising an identification of the first channel or the second user and a weight associated with the identification that indicates a pattern of interactions by the first user with the first channel or the second user;

identifying, based at least in part on a first embedding associated with the representation, a second channel of the plurality of channels or a third user;

determining that a likelihood of interaction by the first user with the second channel or the third user satisfies a target metric; and based at least in part on the likelihood of interaction satisfying the target metric, causing a communication, associated with the first user and sent via the communication platform, to be associated with second channel or the third user.

17. The non-transitory computer-readable medium of claim 16, wherein:
causing the communication associated with the first user to be associated with the second channel or the third user comprises at least one of:
causing the communication associated with the first user to be associated with the second channel based at least in part on a first similarity between the first embedding and a second embedding of a data structure, or
causing the first user to be added to the second channel based at least in part on the first similarity; or
wherein causing the communication associated with the first user to be associated with the second channel or the third user is based at least in part on a second similarity between the first embedding and a third embedding that is associated with the communication.

18. The non-transitory computer-readable medium of claim 17, wherein the second embedding is based at least in part on a portion of a graph indicating at least one of a degree of interaction between each of the first channel, the second channel, the first user, and the second user.

19. The non-transitory computer-readable medium of claim 17, wherein:
receiving the communications is responsive to the first user joining the first channel; and
the operations further comprise:
in response to the first user joining the first channel, transmitting, to a computing device associated with the first user, a recommendation to join the second channel, wherein the recommendation is based at least in part on the first similarity; and
the operations comprise causing the first user to be added to the second channel based at least in part on the first similarity responsive to receiving an acceptance of the recommendation.

20. The non-transitory computer-readable medium of claim 17, wherein:
receiving the communications comprises receiving a first fragment of a draft message indicating one or more users identified as recipients;
the second embedding is based at least in part on a portion of the representation indicating a degree of interaction between the second user or the third user and at least one of channels or users;
the third embedding is based at least in part on a second portion of the representation indicating interaction of the one or more users with the at least one of the channels or the users; and
the operations further comprise causing the communication to be associated with the second user or the third user based at least in part on the second similarity between the third embedding and the second embedding.

* * * * *